(12) United States Patent
Kamiyama

(10) Patent No.: US 12,301,009 B2
(45) Date of Patent: May 13, 2025

(54) CIRCUIT DEVICE AND REAL-TIME CLOCK DEVICE

(71) Applicant: SEIKO EPSON CORPORATION, Tokyo (JP)

(72) Inventor: Masayuki Kamiyama, Chino (JP)

(73) Assignee: SEIKO EPSON CORPORATION (JP)

( * ) Notice: Subject to any disclaimer, the term of this patent is extended or adjusted under 35 U.S.C. 154(b) by 18 days.

(21) Appl. No.: 18/497,065

(22) Filed: Oct. 30, 2023

(65) Prior Publication Data

US 2024/0146068 A1    May 2, 2024

(30) Foreign Application Priority Data

Oct. 31, 2022    (JP) ................ 2022-174163

(51) Int. Cl.
  *H02J 3/38*    (2006.01)
  *H02J 7/00*    (2006.01)
  *H02J 7/34*    (2006.01)

(52) U.S. Cl.
  CPC ........ *H02J 3/381* (2013.01); *H02J 7/007182* (2020.01); *H02J 7/345* (2013.01); *H02J 2300/24* (2020.01)

(58) Field of Classification Search
  CPC ...... H02J 3/38; H02J 3/381; H02J 7/00; H02J 7/00782; H02J 7/34; H02J 7/345; H02J 2300/24
  See application file for complete search history.

(56) References Cited

U.S. PATENT DOCUMENTS

2014/0008984 A1    1/2014    Kamiyama et al.

FOREIGN PATENT DOCUMENTS

JP    2014-017965 A    1/2014

*Primary Examiner* — Robert L Deberadinis
(74) *Attorney, Agent, or Firm* — Harness, Dickey & Pierce, P.L.C.

(57) ABSTRACT

A circuit device includes a battery power supply terminal, an energy harvest power supply terminal, a storage power supply terminal, a power supply switch circuit, and a control circuit that controls the power supply switch circuit. In a first state, the power supply switch circuit outputs a storage power supply voltage to a supply node while charging the battery by supplying an energy harvest power supply voltage to the battery power supply terminal. In a second state, the power supply switch circuit outputs the storage power supply voltage and the energy harvest power supply voltage to the supply node while charging a storage capacitor by supplying the energy harvest power supply voltage to the storage power supply terminal.

13 Claims, 25 Drawing Sheets

FIG. 17

| STATE BEFORE TRANSITION | | CONDITION | STATE AFTER TRANSITION | |
|---|---|---|---|---|
| ST1 | STARTUP MODE | A | VDD2 > pVDD2_OFF ; EH ON<br>VDD > pVDFULL ; STORAGE CAPACITOR FULLY CHARGED<br>VDD > VDD_POR | ST2 | BATTERY CHARGE<br>EH NORMAL MODE |
| ST2 | BATTERY CHARGE<br>EH NORMAL MODE | B | VDD2 > pVDD2_OFF ; EH ON<br>VDD < mVDFULL ; STORAGE CAPACITOR RECHARGE | ST3 | STORAGE CAPACITOR<br>RECHARGE<br>EH NORMAL MODE |
| ST2 | BATTERY CHARGE<br>EH NORMAL MODE | C | VDD2 > pVDD2_OFF ; EH ON<br>VDD > mVDFULL ; STORAGE CAPACITOR RECHARGE UNNECESSARY<br>VBAT > pVBFULL ; BATTERY FULLY CHARGED | ST4 | FULLY CHARGED<br>EH NORMAL MODE |
| ST2 | BATTERY CHARGE<br>EH NORMAL MODE | D | VDD2 < mVDD2_OFF | ST5 | BACKUP MODE<br>OR NORMAL MODE |

FIG. 18

| STATE BEFORE TRANSITION | | CONDITION | STATE AFTER TRANSITION | |
|---|---|---|---|---|
| ST3 | STORAGE CAPACITOR RECHARGE EH NORMAL MODE | E | VDD2 > pVDD2_OFF : EH ON<br>VDD > pVDFULL : STORAGE CAPACITOR FULLY CHARGED | ST2 | BATTERY CHARGE EH NORMAL MODE |
| ST3 | STORAGE CAPACITOR RECHARGE EH NORMAL MODE | F | VDD2 < mVDD2_OFF : EH OFF | ST5 | BACKUP MODE OR NORMAL MODE |
| ST4 | FULLY CHARGED EH NORMAL MODE | G | VDD2 > pVDD2_OFF : EH ON<br>VDD > mVDFULL : STORAGE CAPACITOR RECHARGE UNNECESSARY<br>VBAT < mVBFULL : BATTERY RECHARGE | ST2 | BATTERY CHARGE EH NORMAL MODE |
| ST4 | FULLY CHARGED EH NORMAL MODE | H | VDD2 > pVDD2_OFF : EH ON<br>VDD < mVDFULL : STORAGE CAPACITOR RECHARGE | ST3 | STORAGE CAPACITOR RECHARGE EH NORMAL MODE |
| ST4 | FULLY CHARGED EH NORMAL MODE | I | VDD2 < mVDD2_OFF : EH OFF | ST5 | BACKUP MODE OR NORMAL MODE |
| ST5 | BACKUP MODE OR NORMAL MODE | J | VDD2 > pVDD2_OFF : EH ON | ST3 | STORAGE CAPACITOR RECHARGE EH NORMAL MODE |

FIG. 21

| STATE BEFORE TRANSITION | | CONDITION | | STATE AFTER TRANSITION | |
|---|---|---|---|---|---|
| ST0 | INITIAL STATE | K | VDD2 > pVDD2_POR<br>VDD = VBAT = GND | ST1 | STARTUP MODE |
| ST4 | FULLY CHARGED EH NORMAL MODE | L1 | INTERNAL TRIGGER OR EXTERNAL TRIGGER | ST6 | VBOUT OUTPUT ON EH NORMAL MODE |
| ST6 | VBOUT OUTPUT ON EH NORMAL MODE | L2 | INTERNAL TRIGGER OR EXTERNAL TRIGGER | ST4 | FULLY CHARGED EH NORMAL MODE |

FIG. 23

| STATE BEFORE TRANSITION | | CONDITION | STATE AFTER TRANSITION | |
|---|---|---|---|---|
| ST51 VBOUT OUTPUT OFF NORMAL MODE | M | VDD2 < mVDD2_OFF : EH OFF<br>VDD < mVDFULL : STORAGE CAPACITOR RECHARGE | ST53 | VBOUT OUTPUT OFF BACKUP MODE |
| ST51 VBOUT OUTPUT OFF NORMAL MODE | N1 | INTERNAL TRIGGER OR EXTERNAL TRIGGER | ST52 | VBOUT OUTPUT ON NORMAL MODE |
| ST52 VBOUT OUTPUT ON NORMAL MODE | N2 | INTERNAL TRIGGER OR EXTERNAL TRIGGER | ST51 | VBOUT OUTPUT OFF NORMAL MODE |
| ST53 VBOUT OUTPUT OFF BACKUP MODE | P1 | INTERNAL TRIGGER OR EXTERNAL TRIGGER | ST54 | VBOUT OUTPUT ON BACKUP MODE |
| ST54 VBOUT OUTPUT ON BACKUP MODE | P2 | INTERNAL TRIGGER OR EXTERNAL TRIGGER | ST53 | VBOUT OUTPUT OFF BACKUP MODE |

FIG. 25

| STATE | ST1 STARTUP MODE | ST7 | ST2 BATTERY CHARGE | ST7 | ST3 STORAGE CAPACITOR RECHARGE | ST7 | ST2 BATTERY CHARGE | ST7 | ST4 FULLY CHARGED |
|---|---|---|---|---|---|---|---|---|---|
| SWE | OFF | OFF | OFF | OFF | OFF | OFF | OFF | OFF | OFF |
| SWDb | ON | OFF | OFF | OFF | ON | OFF | OFF | OFF | OFF |
| SWDa | ON | OFF | OFF | OFF | ON | OFF | OFF | OFF | OFF |
| SWCb | OFF | OFF | ON | OFF | OFF | OFF | ON | OFF | OFF |
| SWCa | OFF | OFF | ON | OFF | OFF | ON | ON | OFF | OFF |
| SWBb | OFF | ON | OFF | ON | OFF | OFF | OFF | ON | OFF |
| SWBa | OFF | OFF | OFF | OFF | ON | OFF | OFF | OFF | OFF |
| SWA | ON | OFF | ON | OFF | ON | OFF | ON | OFF | ON |
| VSEN | | | | | | | | | |

FIG. 26

| STATE | ST4 FULLY CHARGED | ST7 | ST6 VBOUT OUTPUT ON EH NORMAL MODE | ST7 | ST4 FULLY CHARGED | ST7 | ST5 BACKUP MODE OR NORMAL MODE |
|---|---|---|---|---|---|---|---|
| SWE | OFF | OFF | ON | OFF | OFF | OFF | ON or OFF |
| SWDb | OFF | OFF | OFF | OFF | OFF | OFF | OFF |
| SWDa | OFF | OFF | OFF | OFF | OFF | OFF | OFF |
| SWCb | OFF | OFF | OFF | OFF | OFF | OFF | OFF |
| SWCa | OFF | ON | ON | OFF | OFF | OFF | OFF |
| SWBb | OFF | OFF | ON | OFF | OFF | ON | ON or OFF |
| SWBa | OFF | OFF | OFF | ON | OFF | OFF | ON or OFF |
| SWA | ON | OFF | OFF | OFF | ON | OFF | ON or OFF |

VSEN

CIRCUIT DEVICE AND REAL-TIME CLOCK DEVICE

The present application is based on, and claims priority from JP Application Serial Number 2022-174163, filed Oct. 31, 2022, the disclosure of which is hereby incorporated by reference herein in its entirety.

BACKGROUND

1. Technical Field

The present disclosure relates to a circuit device, a real-time clock device, and the like.

2. Related Art

JP-A-2014-017965 discloses a real-time clock device including an RTC circuit and a power supply switching circuit. The power supply switching circuit is supplied with a power supply voltage from a main power supply and a power supply voltage from a backup power supply such as a secondary battery. The power supply switching circuit switches from a normal mode to a standby mode based on an output signal from a power supply monitoring circuit that monitors a voltage of the main power supply. In the normal mode, the power supply switching circuit intermittently turns on and off a switch circuit provided between the main power supply and the backup power supply, and the power supply monitoring circuit monitors a power supply. In the standby mode, the power supply switching circuit turns off the switch circuit. Accordingly, an unnecessary current flow from the backup power supply when the main power supply is cut off is reduced, and the power supply is quickly switched.

An energy harvest power supply that obtains power from energy present in an environment may be used as a power supply of a circuit. Since the energy harvest power supply is unstable, appropriate power supply switching control is required to supply a stable power supply to a circuit. JP-A-2014-017965 discloses switching control between the main power supply and the backup power supply such as a secondary battery, but does not disclose switching control of a power supply including an energy harvest power supply.

SUMMARY

An aspect of the present disclosure relates to a circuit device including: a battery power supply terminal configured to be coupled to a battery; an energy harvest power supply terminal configured to be coupled to an energy harvest power supply; a storage power supply terminal configured to be coupled to a storage capacitor; a power supply switch circuit; and a control circuit configured to control the power supply switch circuit. The power supply switch circuit outputs, in a first state, a storage power supply voltage from the storage power supply terminal to a supply node while charging the battery by supplying an energy harvest power supply voltage from the energy harvest power supply terminal to the battery power supply terminal, and outputs, in a second state, the storage power supply voltage and the energy harvest power supply voltage to the supply node while charging the storage capacitor by supplying the energy harvest power supply voltage to the storage power supply terminal.

Another aspect of the present disclosure relates to a real-time clock device including: the above-described circuit device and a resonator electrically coupled to the oscillation circuit.

BRIEF DESCRIPTION OF THE DRAWINGS

FIG. 17 shows an example of transition conditions.
FIG. 18 shows an example of the transition conditions.
FIG. 21 shows an example of the transition conditions.
FIG. 23 shows an example of the transition conditions.
FIG. 25 shows an example of a timing chart showing the progress of the state transitions.
FIG. 26 shows an example of a timing chart showing the progress of the state transitions.

DESCRIPTION OF EMBODIMENTS

Hereinafter, a preferred embodiment according to the present disclosure will be described in detail. The embodiment to be described below does not unduly limit contents described in claims, and not all configurations described in the embodiment are necessarily essential constituent elements.

1. Configuration Example

Figure 1:
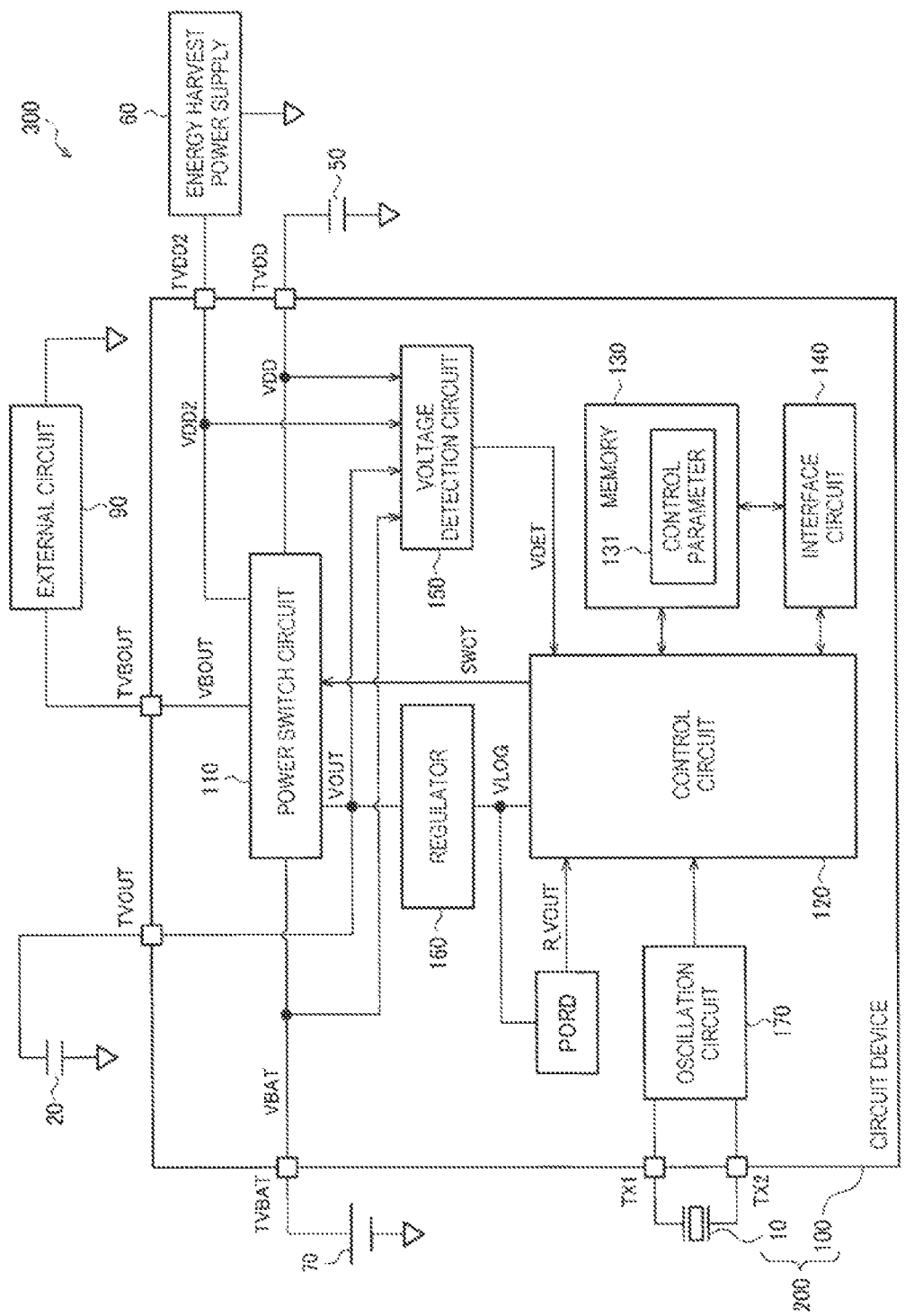
FIG. 1 is a configuration example of a circuit device, a real-time clock device, and an electronic device.

FIG. 1 is a configuration example of a circuit device, a real-time clock device including the circuit device, and an electronic device including the real-time clock device according to the embodiment. Here, an example in which power supply switching control according to the embodiment is applied to a real-time clock device will be described, whereas an application target of the power supply switching control is not limited to the real-time clock device, and may be various devices capable of using an energy harvest power supply.

An electronic device 300 includes a real-time clock device 200, an external circuit 90, a stabilizing capacitor 20, an energy harvest power supply 60, a storage capacitor 50, and a battery 70. The electronic device 300 may be various devices that include the energy harvest power supply 60 and that use time point information output from the real-time clock device 200. The electronic device 300 is, for example, a wrist watch, a wearable device, an electronic computer, an outdoor lighting device, a security camera, a fixed point camera, or a structural health monitor.

The external circuit 90 is a circuit provided outside a circuit device 100 or the real-time clock device 200, and operates using a voltage VBOUT output from the real-time clock device 200 as a power supply voltage. The external circuit 90 is, for example, an RF module for performing wireless communication, a sensor device for monitoring a state of a system, a processor such as a microcomputer or a CPU, or a controller for controlling an electronic device.

The stabilizing capacitor 20 is a so-called bypass capacitor, and stabilizes a voltage VOUT that is an internal power supply voltage of the circuit device 100.

The energy harvest power supply 60 is a power supply that generates power from energy existing in a surrounding environment. The energy harvest power supply 60 is a power supply whose voltage supply state changes according to an external environment or a power supply that supplies a voltage at an indefinite timing. Energy existing in the environment is, for example, natural light, artificial light, heat, temperature difference, or vibration. Examples of the energy harvest power supply 60 include a solar cell that converts natural light or artificial light into power, a thermocouple that converts heat or a temperature difference into power, and a piezoelectric element that converts vibration into power.

The storage capacitor 50 is a capacitor for temporarily storing an energy harvest power supply voltage VDD2 which is a power supply voltage output from the energy harvest power supply 60. A storage power supply voltage VDD, which is a voltage stored in the storage capacitor 50, is supplied to the real-time clock device 200 as a main power supply.

The battery 70 is a backup power supply of the real-time clock device 200. A battery power supply voltage VBAT which is a voltage output from the battery 70 is supplied to the real-time clock device 200 as the backup power supply. The battery 70 is a secondary battery that can be repeatedly charged and discharged, and is, for example, a lithium battery, a lithium ion battery, a nickel hydrogen battery, or a lead storage battery. Alternatively, the battery 70 is an electric double-layer capacitor (EDLC) for a backup power supply.

The real-time clock device 200 operates by receiving a power supply from the energy harvest power supply 60, the storage capacitor 50, or the battery 70, and generates current time point information. Even when the main power supply is not supplied, the real-time clock device 200 continues to generate the current time point information by receiving the power supply from the backup power supply.

The real-time clock device 200 includes the circuit device 100 and a resonator 10. The real-time clock device 200 includes, for example, the circuit device 100 and the resonator 10 accommodated in a package.

The resonator 10 is an element that generates mechanical oscillation by an electric signal. The resonator 10 can be implemented by a resonator element such as a quartz crystal resonator element. For example, the resonator 10 is a tuning fork type quartz crystal resonator element. Alternatively, the resonator 10 can be implemented by a quartz crystal resonator element that has a cut angle of AT cut, SC cut, or the like and that resonates in a thickness-shear manner. The resonator 10 according to the embodiment can be implemented by various resonator elements such as a resonator element of a type other than the tuning fork type or the thickness-shear resonating type, or a piezoelectric resonator element formed of a material other than quartz crystal. For example, a SAW resonator or a MEMS resonator as a silicon resonator formed by using a silicon substrate may be adopted as the resonator 10. SAW is an abbreviation for surface acoustic wave, and MEMS is an abbreviation for micro electro mechanical systems.

The circuit device 100 includes a power supply switch circuit 110, a control circuit 120, a memory 130, an interface circuit 140, a voltage detection circuit 150, a regulator 160, an oscillation circuit 170, and a power-on reset circuit PORD. The real-time clock device 200 includes a storage power supply terminal TVDD, an energy harvest power supply terminal TVDD2, a battery power supply terminal TVBAT, a power supply output terminal TVBOUT, and terminals TVOUT, TX1, and TX2. The circuit device 100 is, for example, an integrated circuit device in which a plurality of circuit elements are integrated on a semiconductor substrate. Each terminal is, for example, a pad formed on the semiconductor substrate.

The storage power supply terminal TVDD is coupled to one end of the storage capacitor 50. The other end of the storage capacitor 50 is coupled to a ground node. The energy harvest power supply terminal TVDD2 is coupled to a power supply output terminal of the energy harvest power supply 60. The battery power supply terminal TVBAT is coupled to a positive terminal of the battery 70. A negative terminal of the battery 70 is coupled to the ground node. The power supply output terminal TVBOUT is coupled to a power supply node of the external circuit 90. The terminal TVOUT is coupled to one end of the stabilizing capacitor 20. The other end of the stabilizing capacitor 20 is coupled to the ground node. Coupling in the embodiment is electrical coupling. The electrical coupling is coupling through which an electrical signal can be transmitted and coupling through which information can be transmitted by the electrical signal. The electrical coupling may be coupling via a passive element, an active element, or the like.

The power supply switch circuit 110 switches coupling among the storage capacitor 50, the energy harvest power supply 60, the battery 70, and the external circuit 90 based on a switch control signal SWCT from the control circuit 120. Specifically, the power supply switch circuit 110 outputs any one of the storage power supply voltage VDD, the energy harvest power supply voltage VDD2, and the battery power supply voltage VBAT as the voltage VOUT which is the internal power supply voltage. The power supply switch circuit 110 switches between a state of charging the storage capacitor 50 with the energy harvest power supply voltage VDD2 and a state of not charging the storage capacitor 50. In addition, the power supply switch circuit 110 switches between a state of charging the battery 70 with the energy harvest power supply voltage VDD2 and a state of not charging the battery 70. The power supply switch circuit 110 switches between a state in which the voltage VOUT is output to the outside as the voltage VBOUT and a state in which the voltage VOUT is not output. For example, the power supply switch circuit 110 switches between a state in which the battery power supply voltage VBAT is output to the outside as the voltage VBOUT via the voltage VOUT via the power supply switch circuit 110 and a state in which the battery power supply voltage VBAT is not output.

The regulator 160 regulates the voltage VOUT to a power supply voltage VLOG for a logic circuit. The regulator 160 is, for example, a linear regulator including an operational amplifier and a resistor, or a switching regulator including a switch and a capacitor.

The power-on reset circuit PORD is coupled to a node of the power supply voltage VLOG, and outputs, based on the power supply voltage VLOG, a power-on reset signal R_VOUT for performing a power-on reset of the control circuit 120. Specifically, the power-on reset circuit PORD changes the power-on reset signal R_VOUT from a reset level to a reset release level when the power supply voltage VLOG exceeds a threshold value due to the supply of the voltage VOUT.

The oscillation circuit 170 is coupled to the resonator 10, generates an oscillation signal by oscillating the resonator 10, and outputs a clock signal based on the oscillation signal to the control circuit 120. One end of the resonator 10 is coupled to the terminal TX1, and the other end of the resonator 10 is coupled to the terminal TX2. The terminal TX1 is coupled to a drive node of the oscillation circuit 170, and the terminal TX2 is coupled to an input node of the oscillation circuit 170. The oscillation circuit 170 may be any of various types of oscillation circuits, such as a Pierce type, a Colpitts type, an inverter type, or a Hartley type.

The memory 130 stores a control parameter 131 for controlling contents of a process executed by the control circuit 120. In addition, the memory 130 may store a control program in which the contents of the process executed by the control circuit 120 are described, may store operation setting information of the circuit device 100, or may function as a working memory of the control circuit 120. The memory 130 includes at least one of a volatile memory such as a RAM and a nonvolatile memory such as an EEPROM. RAM is an abbreviation for random access memory. EEPROM is an abbreviation for electrically erasable and programmable read only memory.

The interface circuit 140 performs communication between a processing device outside the real-time clock device 200 and the circuit device 100. The processing device writes, for example, the control parameter 131, the control program, or the operation setting information to the memory 130 via the interface circuit 140. Since the control parameter 131 can be written from the outside, the process performed by the control circuit 120 is programmable.

The voltage detection circuit 150 detects a voltage value of the storage power supply voltage VDD, a voltage value of the energy harvest power supply voltage VDD2, a voltage value of the battery power supply voltage VBAT, and a voltage value of the voltage VOUT, and outputs data of each voltage value as a detection result VDET to the control circuit 120. The voltage detection circuit 150 includes, for example, a selector that selects the storage power supply voltage VDD, the energy harvest power supply voltage VDD2, the battery power supply voltage VBAT, or the voltage VOUT, and an A/D conversion circuit that A/D converts the voltage selected by the selector.

The control circuit 120 is a logic circuit that operates in response to the power supply voltage VLOG for the logic circuit and the clock signal from the oscillation circuit 170. The control circuit 120 is a sequencer or a controller including a state machine or the like, and performs various processes based on the control parameter 131. The control parameter 131 is a parameter for controlling the contents of the process performed by the sequencer or the controller. The control circuit 120 generates the current time point information by performing a real-time clock process based on the clock signal from the oscillation circuit 170. The interface circuit 140 outputs the current time point information to an external processing device or the like. The control circuit 120 outputs the switch control signal SWCT to the power supply switch circuit 110 to control coupling switching in the power supply switch circuit 110. Specifically, the control circuit 120 compares the voltage values from the voltage detection circuit 150 with various threshold values, determines a coupling state of the power supply switch circuit 110 based on comparison results, and outputs the switch control signal SWCT indicating the coupling state to the power supply switch circuit 110.

In the above description, functions of the control circuit 120 are implemented by the sequencer or the controller and the control parameter 131 for controlling the contents of the process performed by the sequencer or the controller, and is not limited thereto. For example, the control circuit 120 may be a processor such as a CPU, a microcomputer, or a DSP, and may perform various processes by executing a control program. In this case, the control parameter 131 is stored in the memory 130 together with the control program, and the processor executes the process using the control program and the control parameter 131, thereby implementing the functions of the sequencer or the controller described above. Alternatively, the control circuit 120 may be a logic circuit in which the functions thereof are incorporated in advance as hardware. In the above description, the control circuit 120 compares the data of each voltage value with the threshold value, and the present disclosure is not limited thereto. The voltage detection circuit 150 may be an analog comparator that compares each voltage value with the threshold value. In this case, a comparison result of the analog comparator is output to the control circuit 120 as the detection result VDET.

Figure 2:
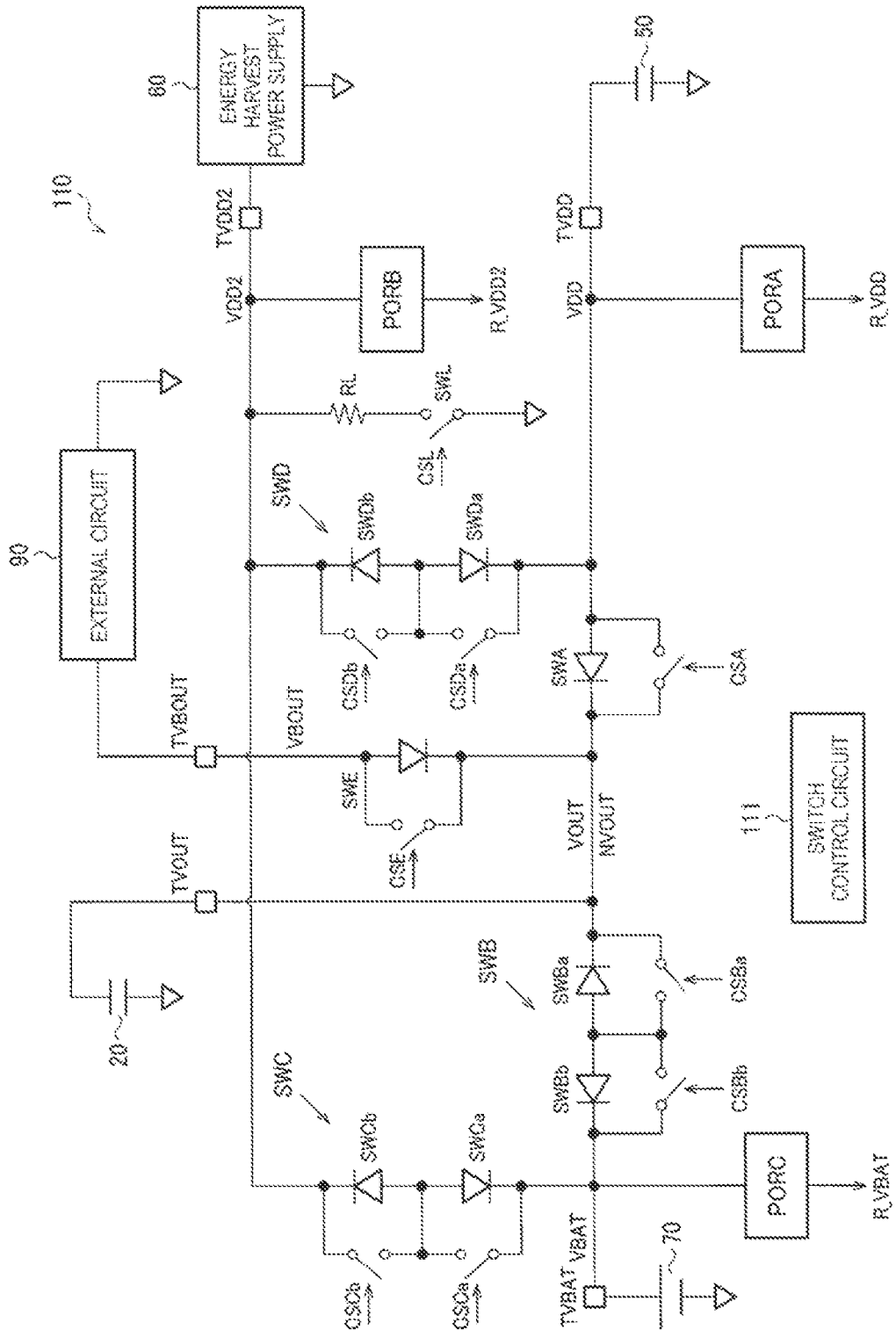
FIG. 2 is a detailed configuration example of a power supply switch circuit.
Figure 3:
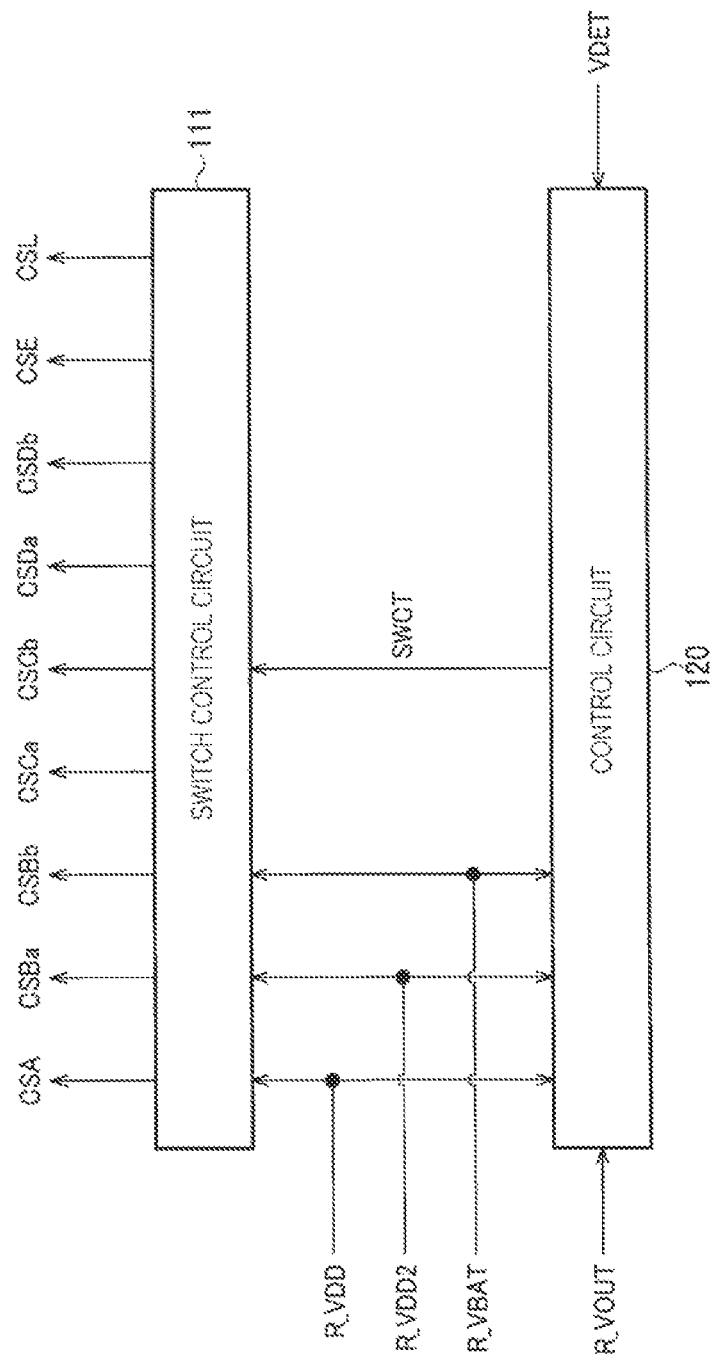
FIG. 3 is a detailed configuration example of a switch control circuit.

FIG. 2 is a detailed configuration example of the power supply switch circuit. FIG. 3 is a detailed configuration example of the switch control circuit. As shown in FIG. 2, the power supply switch circuit 110 includes a switch control circuit 111, a first switch SWA, a second switch SWB, a third switch SWC, a fourth switch SWD, a fifth switch SWE, a switch SWL, and a resistor RL. The power supply switch circuit 110 includes power-on reset circuits PORA, PORB, and PORC. An example of coupling between the switch control circuit 111 and the switches is shown in FIG. 3. Hereinafter, "first to fifth" of the first to fifth switches will be omitted.

The switch SWB includes switches SWBa and SWBb coupled in series between one end and the other end of the switch SWB. The switch SWC includes switches SWCa and SWCb coupled in series between one end and the other end of the switch SWC. The switch SWD includes switches SWDa and SWDb coupled in series between one end and the other end of the switch SWD.

The switch SWA includes a MOS transistor serving as a switch element and a body diode parasitic between a source and a drain of the MOS transistor. However, a configuration of the switch SWA is not limited thereto. The switch SWA may include a switch element and a diode coupled in parallel to the switch element. When the switch element is turned on, both ends of the switch SWA are bidirectionally coupled via the switch element. When the switch element is turned off, the switch SWA can cause a current to flow only in a forward direction of the diode. Turning on the switch SWA indicates that the switch element of the switch SWA is turned on, and turning off the switch SWA indicates that the switch element of the switch SWA is turned off. The switches SWBa, SWBb, SWCa, SWCb, SWDa, SWDb, and SWE are similar to the switch SWA.

Turning on the switch SWB indicates that both the switches SWBa and SWBb are turned on, and turning off the switch SWB indicates that both the switches SWBa and SWBb are turned off. When the switch SWB is turned on, both ends of the switch SWB are bidirectionally coupled, and when the switch SWB is turned off, both ends of the switch SWB are bidirectionally cut off. The switches SWC and SWD are similar to the switch SWB.

One end of the switch SWA is coupled to the storage power supply terminal TVDD coupled to the storage capacitor 50, and the other end is coupled to a supply node NVOUT of the voltage VOUT. A forward direction of a diode of the switch SWA is a direction from the storage power supply terminal TVDD to the supply node NVOUT.

One end of the switch SWB is coupled to the battery power supply terminal TVBAT coupled to the battery 70, and the other end is coupled to the supply node NVOUT of the voltage VOUT. The switch SWBa in the switches SWBa and SWBb is coupled to a supply node NVOUT side. A forward direction of a diode of the switch SWBa is a direction from the battery power supply terminal TVBAT to the supply node NVOUT. A forward direction of a diode of the switch SWBb is a direction from the supply node NVOUT to the battery power supply terminal TVBAT.

One end of the switch SWC is coupled to the energy harvest power supply terminal TVDD2 coupled to the energy harvest power supply 60, and the other end is coupled to the battery power supply terminal TVBAT coupled to the battery 70. The switch SWCa in the switches SWCa and SWCb is coupled to a battery power supply terminal TVBAT side. A forward direction of a diode of the switch SWCa is a direction from the energy harvest power supply terminal TVDD2 to the battery power supply terminal TVBAT. A forward direction of a diode of the switch SWCb is a direction from the battery power supply terminal TVBAT to the energy harvest power supply terminal TVDD2.

One end of the switch SWD is coupled to the energy harvest power supply terminal TVDD2 coupled to the energy harvest power supply 60, and the other end is coupled to the storage power supply terminal TVDD coupled to the storage capacitor 50. The switch SWDa in the switches SWDa and SWDb is coupled to a storage power supply terminal TVDD side. A forward direction of a diode of the switch SWDa is a direction from the energy harvest power supply terminal TVDD2 to the storage power supply terminal TVDD. A forward direction of a diode of the switch SWDb is a direction from the storage power supply terminal TVDD to the energy harvest power supply terminal TVDD2.

One end of the switch SWE is coupled to the supply node NVOUT, and the other end is coupled to the power supply output terminal TVBOUT coupled to the external circuit 90. A forward direction of a diode of the switch SWE is a direction from the power supply output terminal TVBOUT to the supply node NVOUT.

The resistor RL and the switch SWL are discharge circuits of the energy harvest power supply 60. One end of the resistor RL is coupled to the energy harvest power supply terminal TVDD2, and the other end is coupled to one end of the switch SWL. The other end of the switch SWL is coupled to the ground node. The switch SWL is, for example, an analog switch including one or a plurality of transistors.

The power-on reset circuit PORA is coupled to the storage power supply terminal TVDD and outputs a power-on reset signal R_VDD based on the storage power supply voltage VDD. Specifically, the power-on reset circuit PORA changes the power-on reset signal R_VDD from the reset level to the reset release level when the storage power supply voltage VDD increases and exceeds a threshold value.

The power-on reset circuit PORB is coupled to the energy harvest power supply terminal TVDD2 and outputs a power-on reset signal R_VDD2 based on the energy harvest power supply voltage VDD2. Specifically, the power-on reset circuit PORB changes the power-on reset signal R_VDD2 from the reset level to the reset release level when the energy harvest power supply voltage VDD2 increases and exceeds a threshold value.

The power-on reset circuit PORC is coupled to the battery power supply terminal TVBAT and outputs a power-on reset signal R VBAT based on the battery power supply voltage VBAT. Specifically, the power-on reset circuit PORC changes the power-on reset signal R VBAT from the reset level to the reset release level when the battery power supply voltage VBAT increases and exceeds a threshold value.

As shown in FIG. 3, the control circuit 120 outputs the switch control signal SWCT based on the detection result VDET of the voltage detection and the power-on reset signals R_VOUT, R_VDD, R_VDD2, and R VBAT.

The switch control circuit 111 outputs signals CSA, CSBa, CSBb, CSCa, CSCb, CSDa, CSDb, CSE, and CSL based on the switch control signal SWCT and the power-on reset signals R_VDD, R_VDD2, and R VBAT. The signal CSA is a signal for controlling the switch SWA to be turned on or off. Similarly, the signals CSBa, CSBb, CSCa, CSCb, CSDa, CSDb, CSE, and CSL are signals for controlling the switches SWBa, SWBb, SWCa, SWCb, SWDa, SWDb, SWE, and SWL to be turned on or off. The switch control circuit 111 controls each switch to an on state or an off state instructed by the switch control signal SWCT. The switch control circuit 111 is a logic circuit. The switch control circuit 111 may include a level shifter that shifts a signal level from the power supply voltage VLOG to a voltage level necessary for gate control of each switch.

2. Modes and States of Switch Circuit

The control circuit 120 controls switch states of the power supply switch circuit 110 according to modes and states. Here, the switch state in each mode and each state will be described. Transitions between the modes and the states will be described later.

Figure 4:
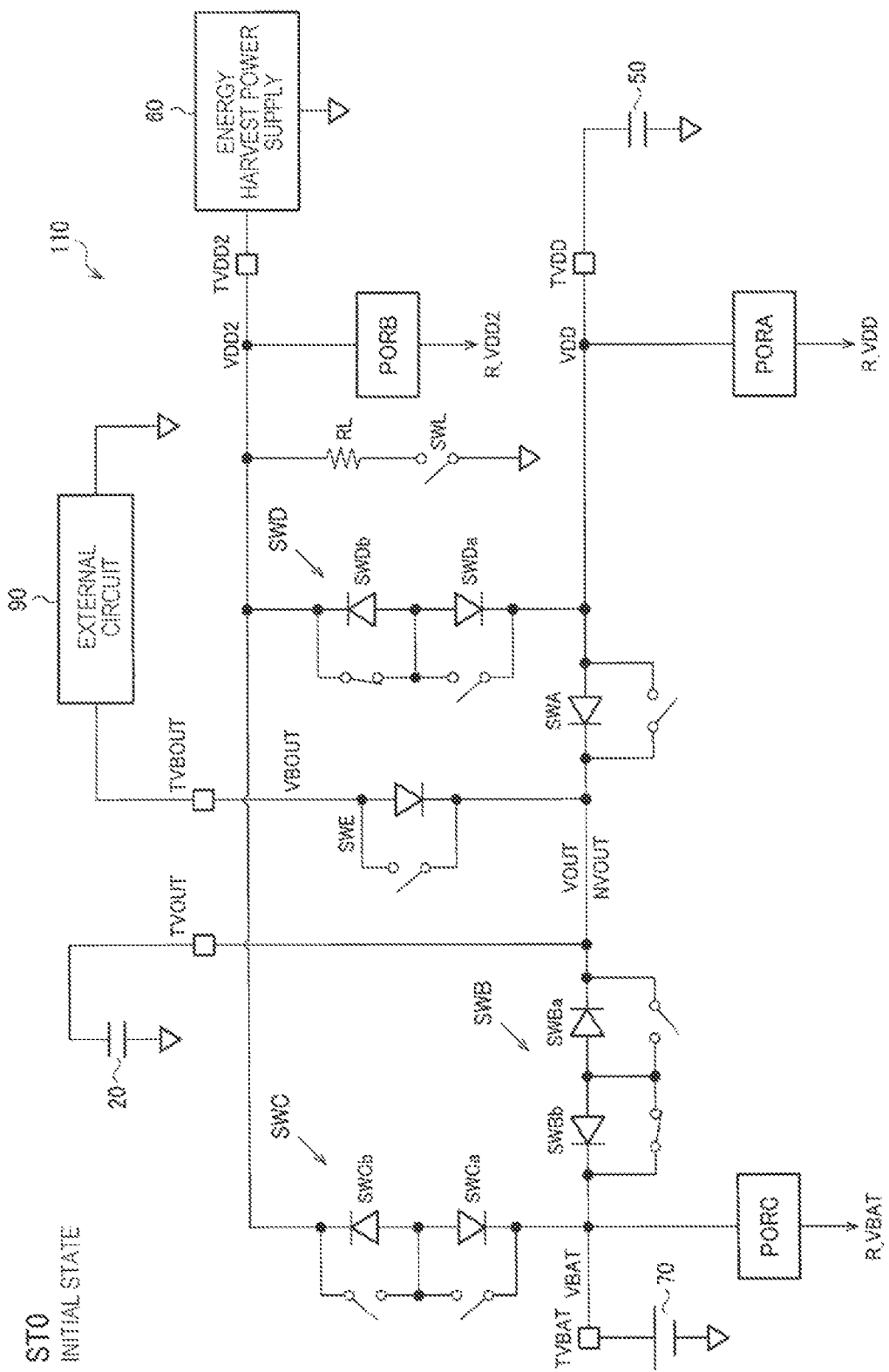
FIG. 4 shows a switch state in an initial state.

FIG. 4 shows a switch state in an initial state. An initial state ST0 is a state before the circuit device 100 is activated, that is, a state in which none of the energy harvest power supply voltage VDD2, the storage power supply voltage VDD, and the battery power supply voltage VBAT is supplied to the circuit device 100.

In the initial state ST0, the switches SWBb and SWDb are turned on, and the switches SWA, SWBa, SWCa, SWCb, SWDa, SWE, and SWL are turned off.

Figure 5:
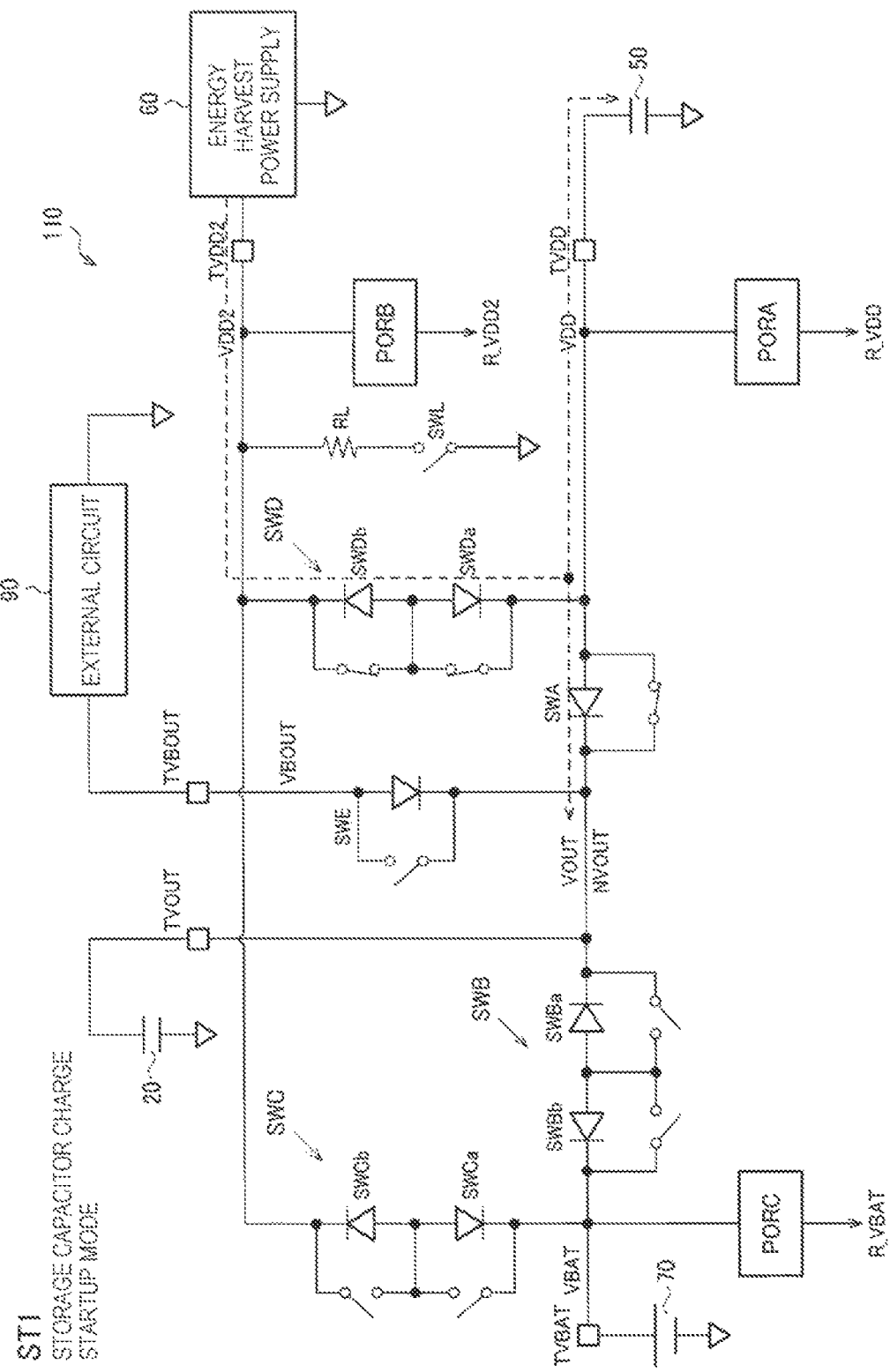
FIG. 5 shows a switch state in a storage capacitor charge state in a startup mode.

FIG. 5 shows a switch state in a storage capacitor charge state in a startup mode. The startup mode is a mode to be set when the circuit device 100 is activated. A storage capacitor charge state ST1 in the startup mode is a state in which the storage capacitor 50 is charged from the energy harvest power supply 60 for the first time.

In the storage capacitor charge state ST1, the switches SWA and SWD are turned on, and the switches SWB, SWC, SWE, and SWL are turned off. Accordingly, the power supply switch circuit 110 couples the energy harvest power supply terminal TVDD2, the storage power supply terminal TVDD, and the supply node NVOUT. The energy harvest power supply voltage VDD2 is supplied to the storage capacitor 50 via the switch SWD, and is supplied as the voltage VOUT to the supply node NVOUT via the switches SWD and SWA.

Figure 6:
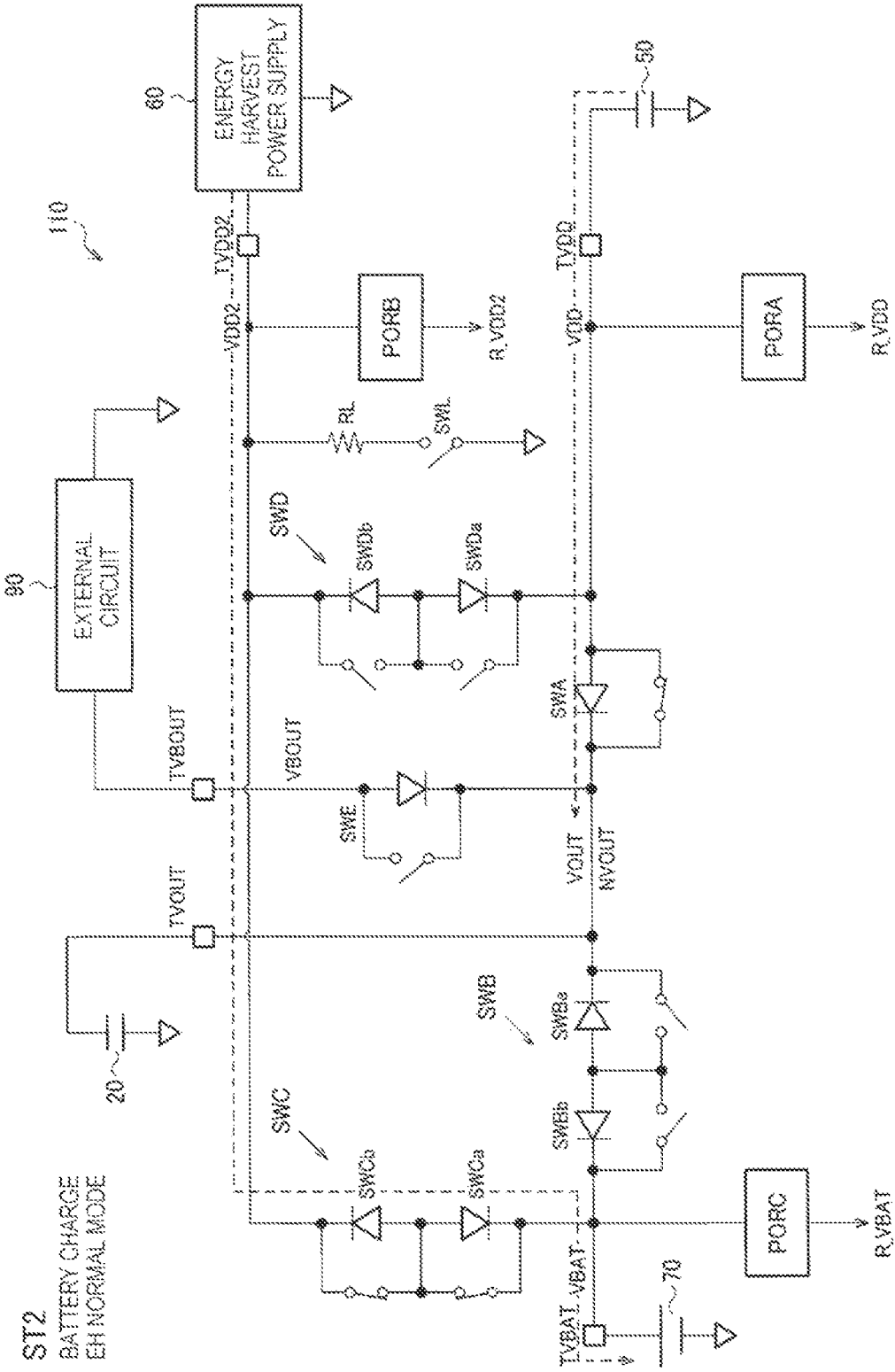
FIG. 6 shows a switch state in a battery charge state in an EH normal mode.

FIG. 6 shows a switch state in a battery charge state in an EH normal mode. EH is an abbreviation for energy harvest. The EH normal mode is a mode to be set when the energy harvest power supply 60 is generating power and the energy harvest power supply voltage VDD2 is supplied to the circuit device 100. A battery charge state ST2 in the EH normal mode is a state in which the battery 70 is charged from the energy harvest power supply 60.

In the battery charge state ST2, the switches SWA and SWC are turned on, and the switches SWB, SWD, SWE, and SWL are turned off. Accordingly, the power supply switch circuit 110 couples the energy harvest power supply terminal TVDD2 and the battery power supply terminal TVBAT, and couples the storage power supply terminal TVDD and the supply node NVOUT. The energy harvest power supply voltage VDD2 is supplied to the battery 70 via the switch SWC. The storage power supply voltage VDD is supplied as the voltage VOUT to the supply node NVOUT via the switch SWA.

Figure 7:
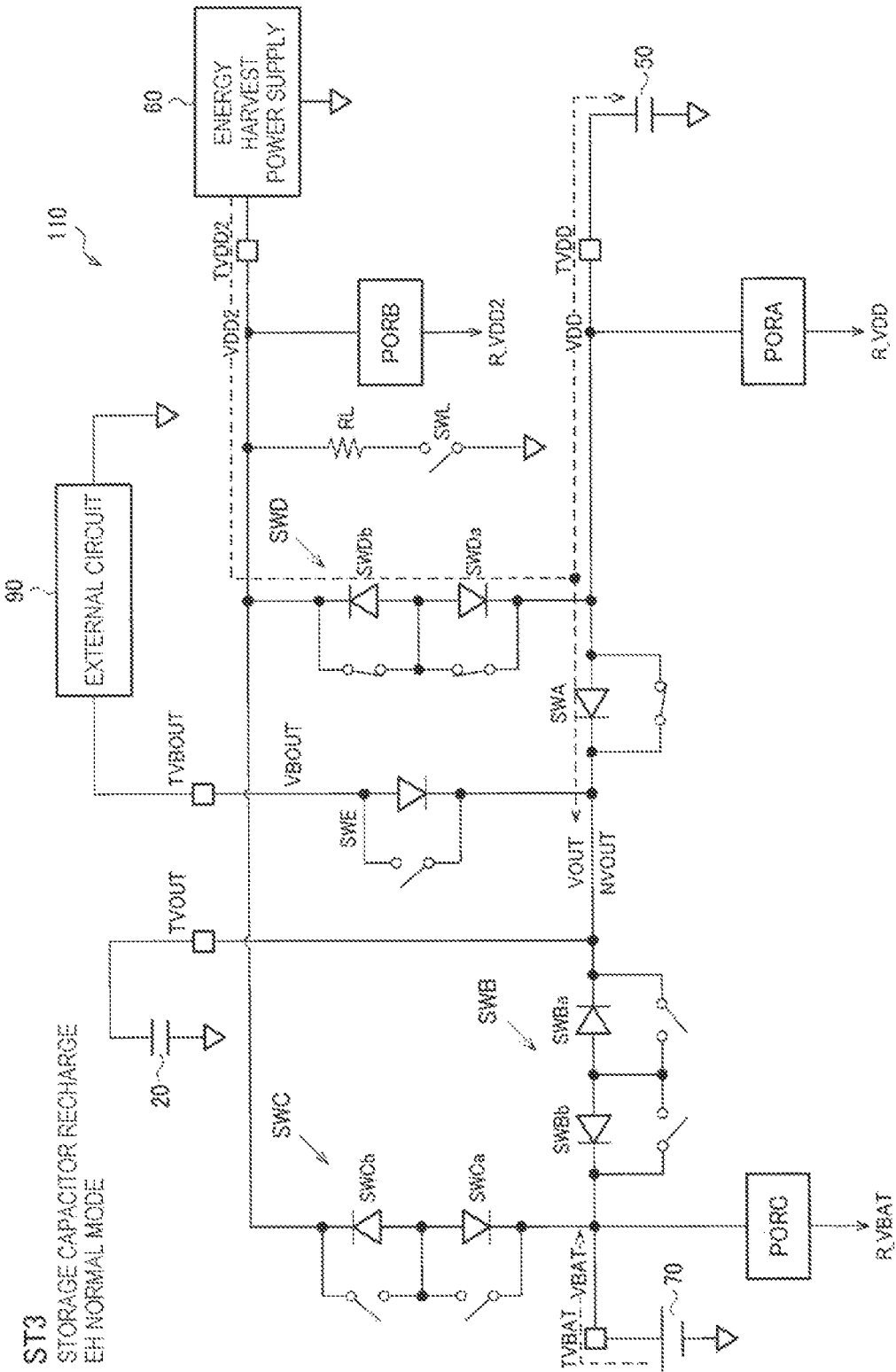
FIG. 7 shows a switch state in a storage capacitor recharge state in the EH normal mode.

FIG. 7 shows a switch state in a storage capacitor recharge state in the EH normal mode. A storage capacitor recharge state ST3 in the EH normal mode is a state in which the storage capacitor 50 is charged from the energy harvest power supply 60 after the storage capacitor 50 is discharged.

In the storage capacitor recharge state ST3, the switches SWA and SWD are turned on, and the switches SWB, SWC, SWE, and SWL are turned off. Accordingly, the power supply switch circuit 110 couples the energy harvest power supply terminal TVDD2, the storage power supply terminal TVDD, and the supply node NVOUT. The energy harvest power supply voltage VDD2 is supplied to the storage capacitor 50 via the switch SWD, and is supplied as the voltage VOUT to the supply node NVOUT via the switches SWD and SWA. Even when the energy harvest power supply voltage VDD2 decreases, the storage power supply voltage VDD is supplied as the voltage VOUT to the supply node NVOUT via the switch SWA. The battery power supply voltage VBAT is supplied to the battery power supply terminal TVBAT, but is not supplied to the supply node NVOUT.

Figure 8:
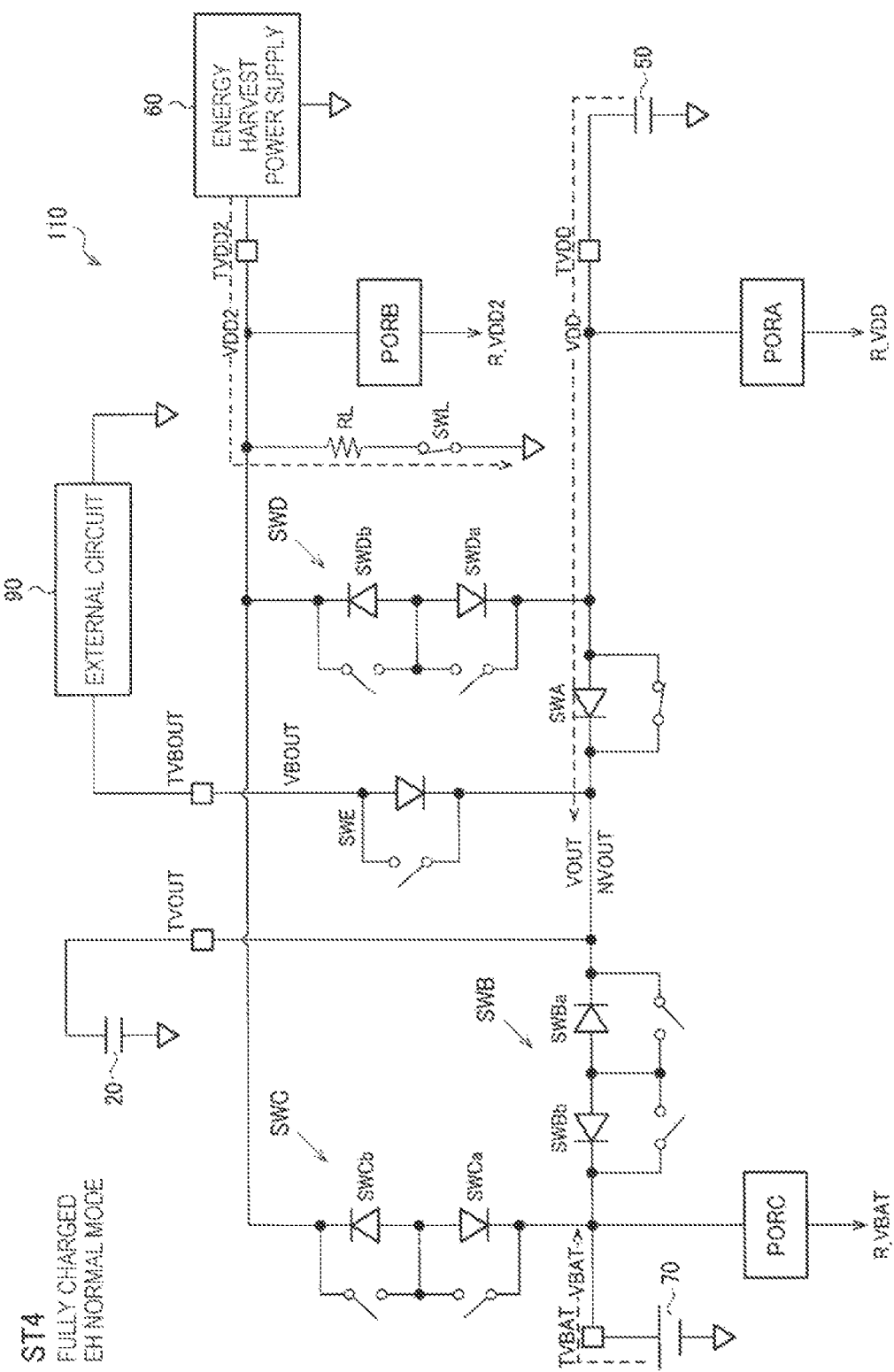
FIG. 8 shows a switch state in a fully charged state in the EH normal mode.

FIG. 8 shows a switch state in a fully charged state in the EH normal mode. A fully charged state ST4 in the EH normal mode is a state in which the storage capacitor 50 and the battery 70 are fully charged.

In the fully charged state ST4, the switches SWA and SWL are turned on, and the switches SWB, SWC, SWD, and SWE are turned off. Accordingly, the power supply switch circuit 110 couples the storage power supply terminal TVDD and the supply node NVOUT. The storage power supply voltage VDD is supplied as the voltage VOUT to the supply node NVOUT via the switch SWA. The battery power supply voltage VBAT is supplied to the battery power supply terminal TVBAT, but is not supplied to the supply node NVOUT. Although the energy harvest power supply 60 is generating power, the power is discharged to the ground node via the resistor RL and the switch SWL since the energy harvest power supply 60 is fully charged.

Figure 9:
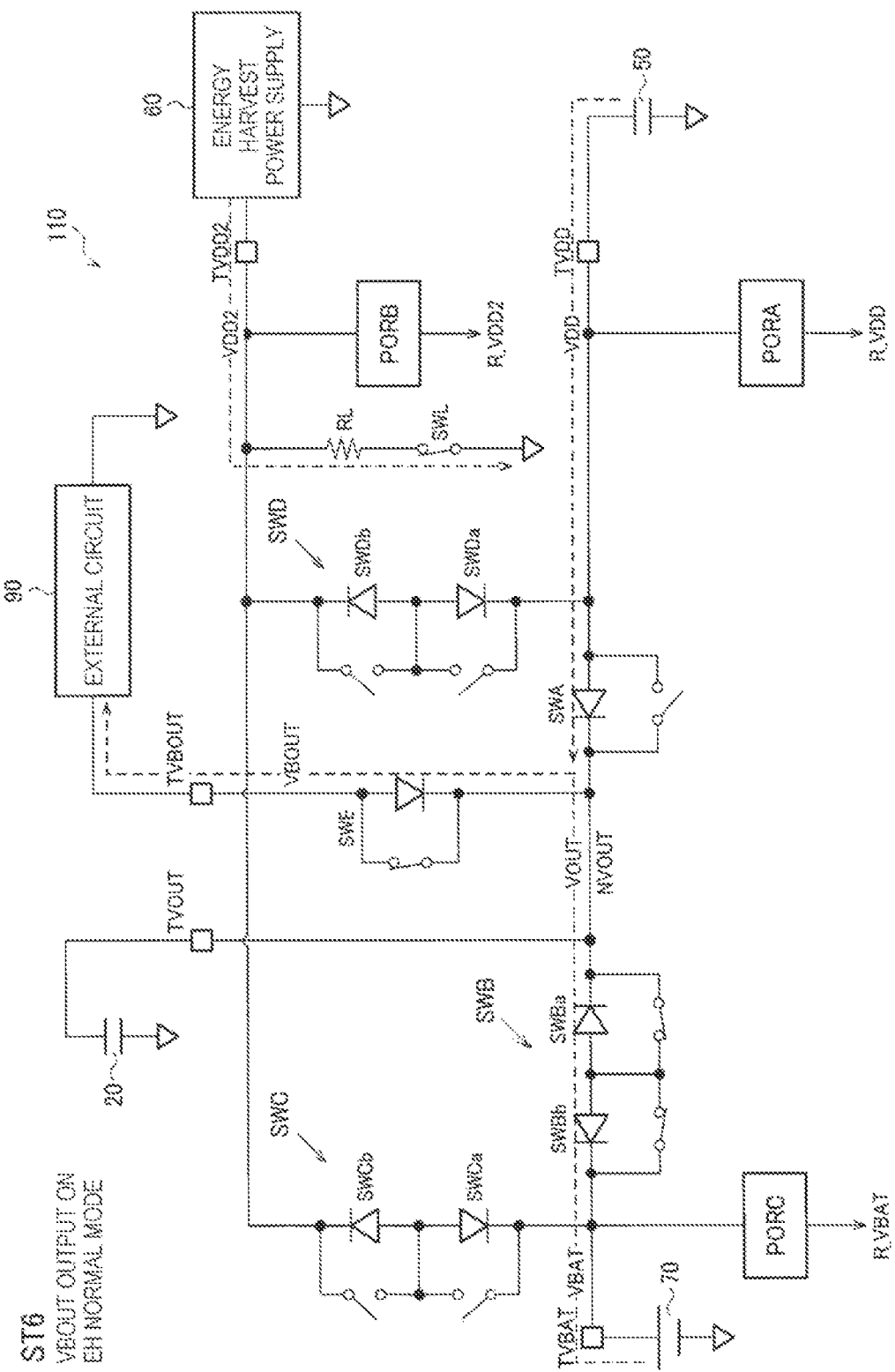
FIG. 9 shows a switch state in a VBOUT output on state in the EH normal mode.

FIG. 9 shows a switch state in a VBOUT output on state in the EH normal mode. A VBOUT output on state ST6 in the EH normal mode is a state in which the voltage VOUT is supplied to the external circuit 90 as the voltage VBOUT.

In the VBOUT output on state ST6, the switches SWB, SWE, and SWL are turned on, and the switches SWA, SWC, and SWD are turned off. Accordingly, the power supply switch circuit 110 couples the battery power supply terminal TVBAT, the supply node NVOUT, and the power supply output terminal TVBOUT. In addition, the power supply switch circuit 110 couples the storage power supply terminal TVDD and the supply node NVOUT via the diode of the switch SWA. The battery power supply voltage VBAT is supplied as the voltage VOUT to the supply node NVOUT via the switch SWB. When VDD>VBAT+$\Delta$Vf, the storage power supply voltage VDD is supplied to supply node NVOUT via the diode of switch SWA. $\Delta$Vf is a forward voltage of the diode of the switch SWA. The voltage VOUT is supplied as the voltage VBOUT to the external circuit 90 via the switch SWE. Although the energy harvest power supply 60 is generating power, the power is discharged to the ground node via the resistor RL and the switch SWL since the energy harvest power supply 60 is fully charged.

Figure 10:
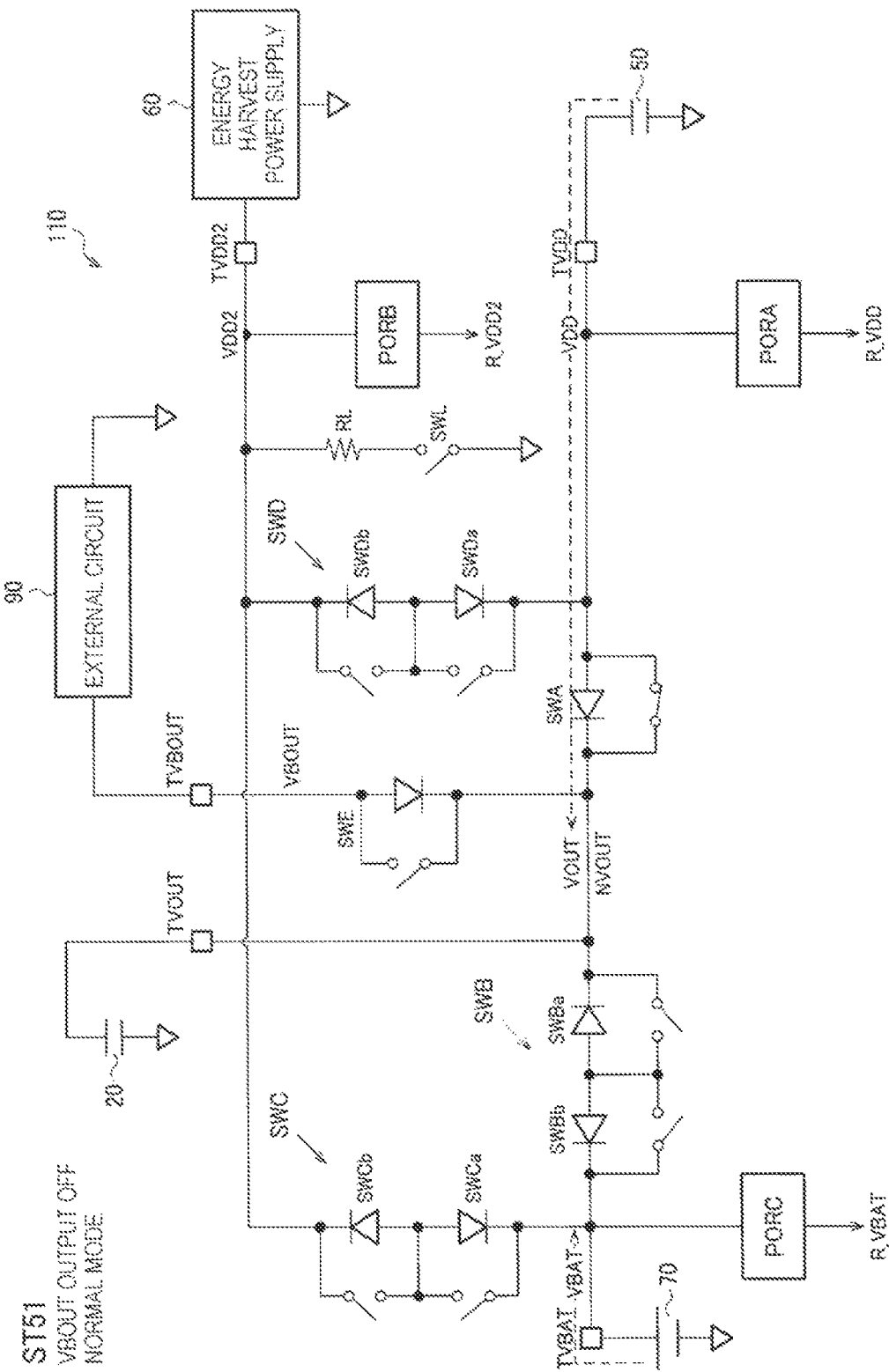
FIG. 10 shows a switch state in a VBOUT output off state in a normal mode.

FIG. 10 shows a switch state in a VBOUT output off state in a normal mode. The normal mode is a mode to be set when the energy harvest power supply 60 is not generating power but the power can be supplied from the storage capacitor 50 to the circuit device 100. A VBOUT output off state ST51 in the normal mode is a state in which the power supply to the external circuit 90 is off.

In the VBOUT output off state ST51, the switch SWA is turned on, and the switches SWB, SWC, SWD, SWE, and SWL are turned off. Accordingly, the power supply switch circuit 110 couples the storage power supply terminal TVDD and the supply node NVOUT. The storage power supply voltage VDD is supplied as the voltage VOUT to the supply node NVOUT via the switch SWA. The battery power supply voltage VBAT is supplied to the battery power supply terminal TVBAT, but is not supplied to the supply node NVOUT. Since the switch SWE is turned off, the voltage VOUT is not supplied to the external circuit 90.

Figure 11:
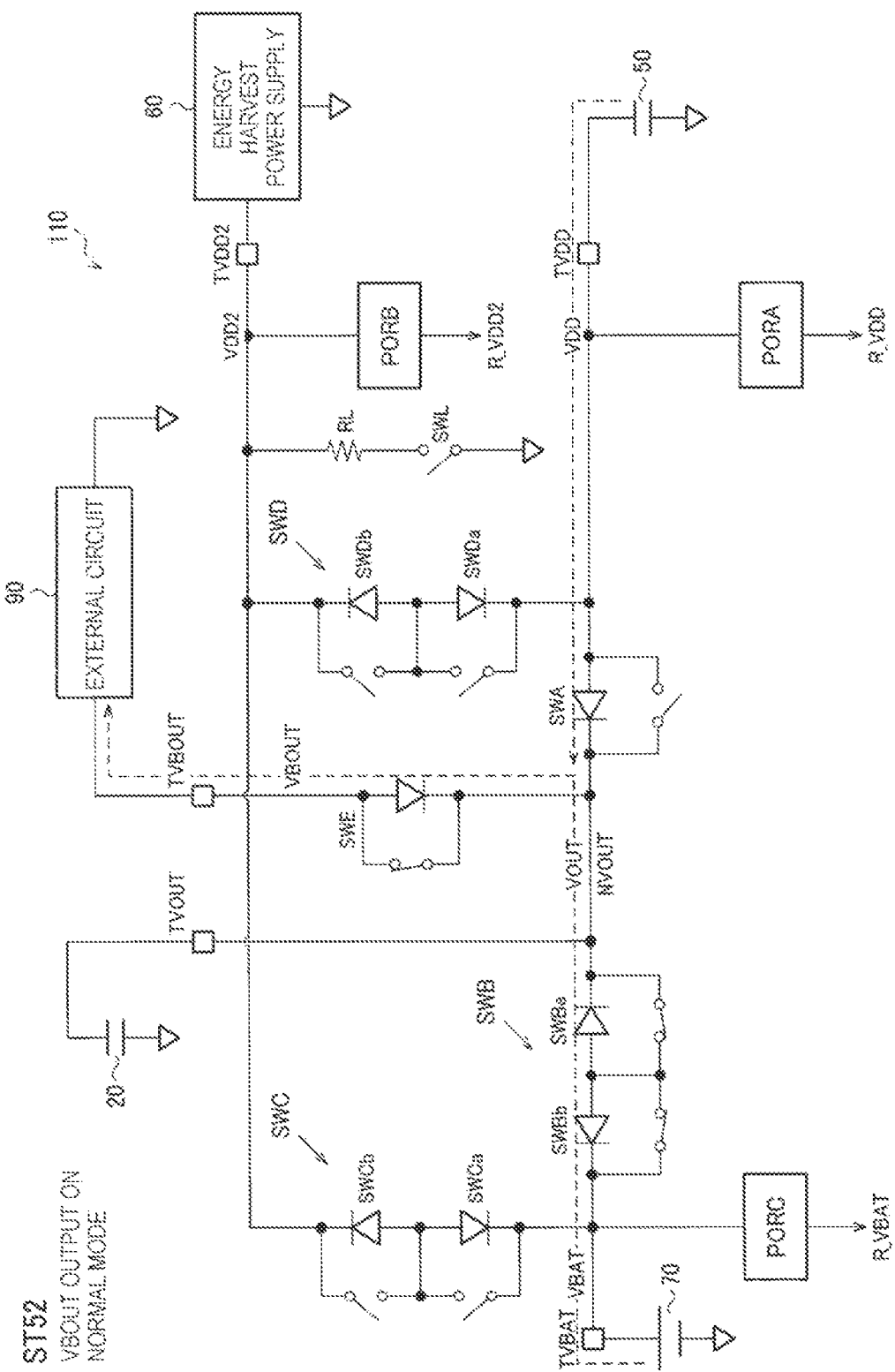
FIG. 11 shows a switch state in the VBOUT output on state in the normal mode.

FIG. 11 shows a switch state in the VBOUT output on state in the normal mode. A VBOUT output on state ST52 in the normal mode is a state in which the voltage VOUT is supplied to the external circuit 90 as the voltage VBOUT.

In the VBOUT output on state ST52, the switches SWB and SWE are turned on, and the switches SWA, SWC, SWD, and SWL are turned off. Accordingly, the power supply switch circuit 110 couples the battery power supply terminal TVBAT, the supply node NVOUT, and the power supply output terminal TVBOUT. In addition, the power supply switch circuit 110 couples the storage power supply terminal TVDD and the supply node NVOUT via the diode of the switch SWA. The battery power supply voltage VBAT is supplied as the voltage VOUT to the supply node NVOUT via the switch SWB. When VDD>VBAT+$\Delta$Vf, the storage power supply voltage VDD is supplied to supply node NVOUT via the diode of switch SWA. The voltage VOUT is supplied as the voltage VBOUT to the external circuit 90 via the switch SWE.

Figure 12:
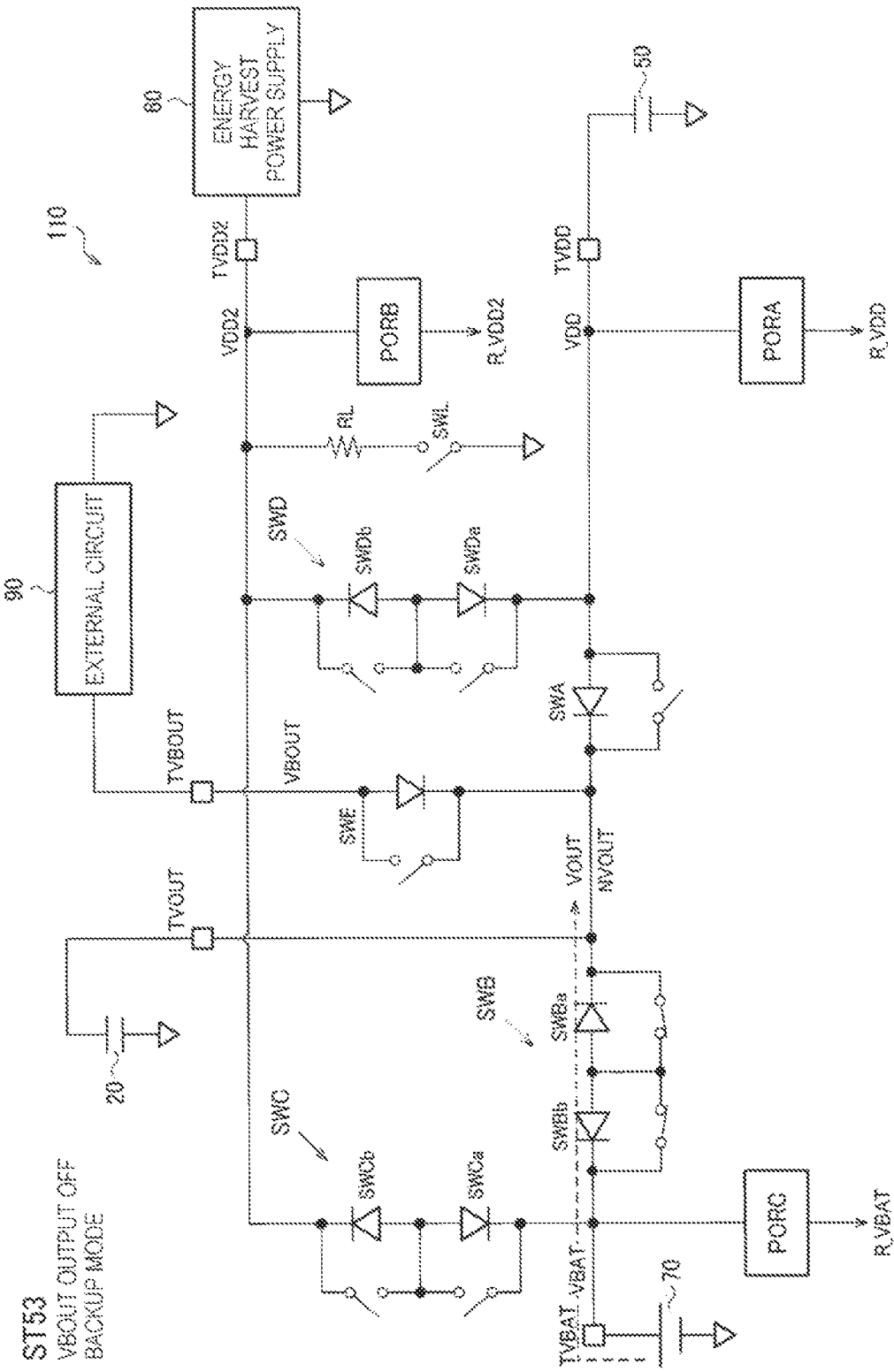
FIG. 12 shows a switch state in the VBOUT output off state in a backup mode.

FIG. 12 shows a switch state in the VBOUT output off state in a backup mode. The backup mode is a mode to be set when the energy harvest power supply 60 is not generating power, the storage capacitor 50 is discharged, and the power is supplied from the battery 70 to the circuit device 100. A VBOUT output off state ST53 in the backup mode is a state in which the power supply to the external circuit 90 is off.

In the VBOUT output off state ST53, the switch SWB is turned on, and the switches SWA, SWC, SWD, SWE, and SWL are turned off. Accordingly, the power supply switch circuit 110 couples the battery power supply terminal TVBAT and the supply node NVOUT. The battery power supply voltage VBAT is supplied as the voltage VOUT to the supply node NVOUT via the switch SWB.

Figure 13:
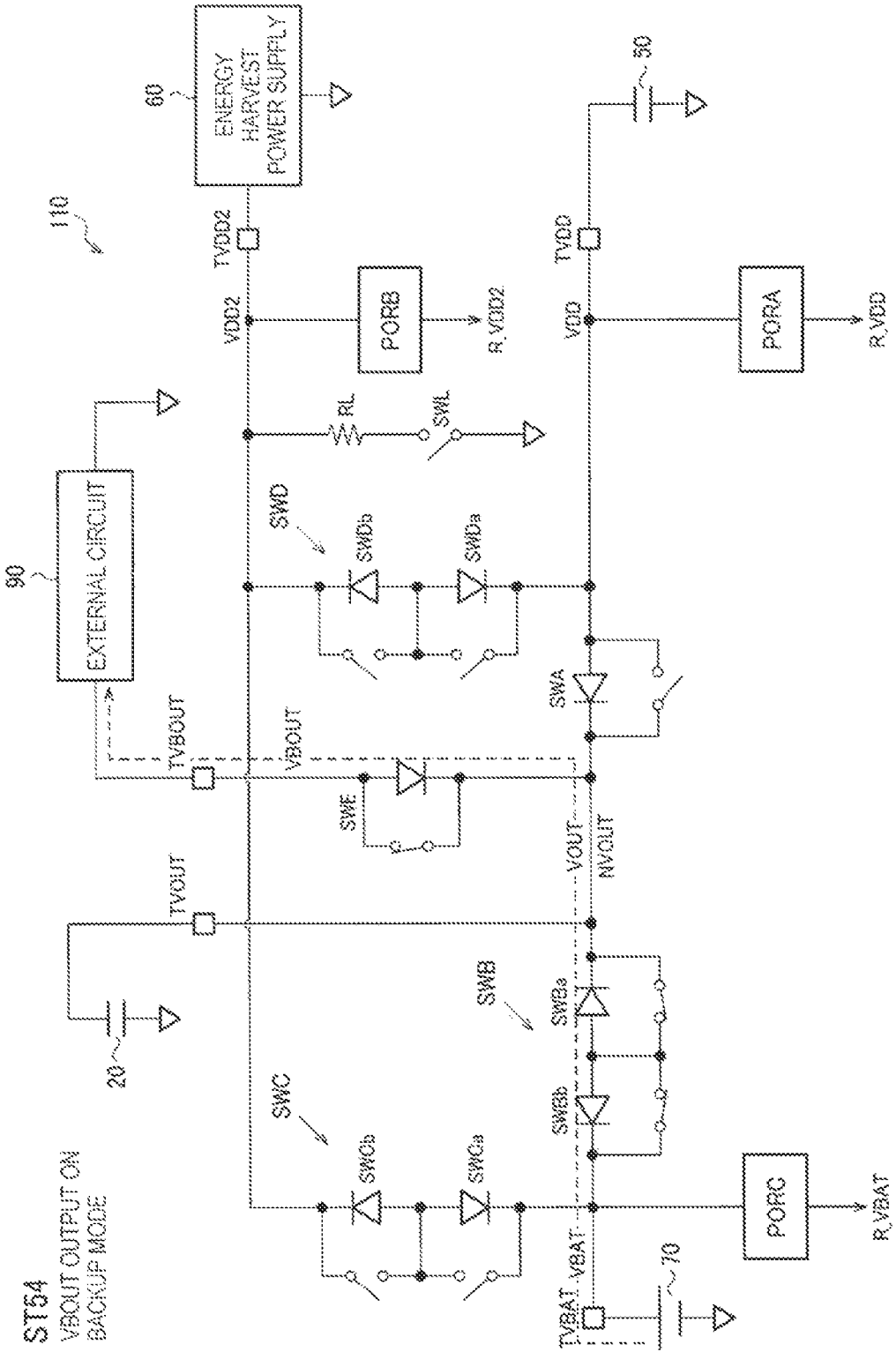
FIG. 13 shows a switch state in the VBOUT output on state in the backup mode.

FIG. 13 shows a switch state in the VBOUT output on state in the backup mode. A VBOUT output on state ST54 in the backup mode is a state in which the voltage VOUT is supplied to the external circuit 90 as the voltage VBOUT.

In the VBOUT output on state ST54, the switches SWB and SWE are turned on, and the switches SWA, SWC, SWD, and SWL are turned off. Accordingly, the power supply switch circuit 110 couples the battery power supply terminal TVBAT, the supply node NVOUT, and the power supply output terminal TVBOUT. The battery power supply voltage VBAT is supplied as the voltage VOUT to the supply node NVOUT via the switch SWB. The voltage VOUT is supplied as the voltage VBOUT to the external circuit 90 via the switch SWE.

Figure 14:
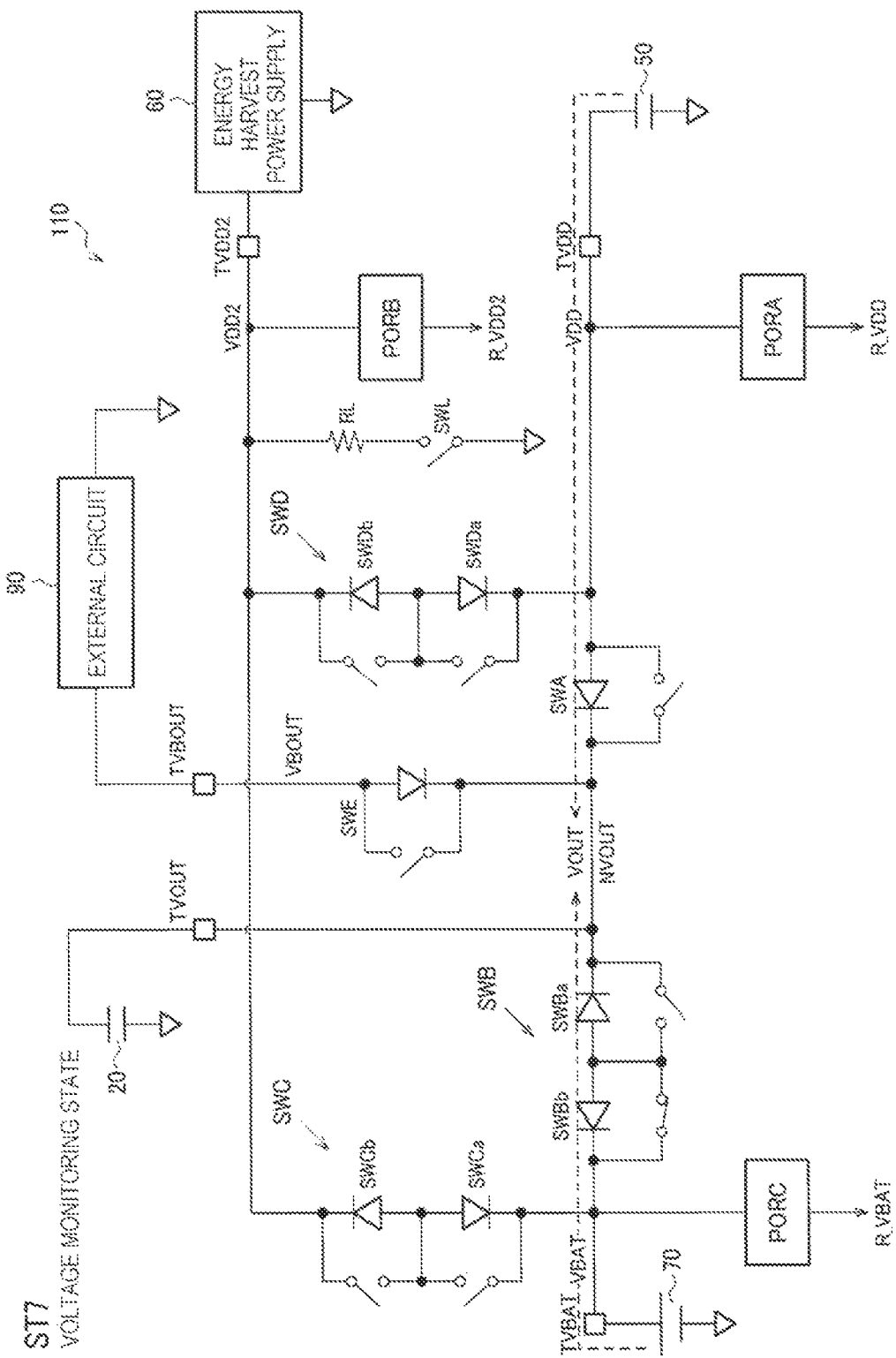
FIG. 14 shows a switch state in a voltage monitoring state.

FIG. 14 shows a switch state in a voltage monitoring state. A voltage monitoring state ST7 is a mode to be set when the voltage detection circuit 150 performs voltage detection. The voltage monitoring state ST7 is intermittently set in each of the states ST1 to ST6 and ST51 to ST54 described above.

In the voltage monitoring state ST7, the switch SWBb is turned on, and the switches SWA, SWBa, SWC, SWD, SWE, and SWL are turned off. Accordingly, the power supply switch circuit 110 couples the battery power supply terminal TVBAT and the supply node NVOUT via the diode of the switch SWBa. In addition, the power supply switch circuit 110 couples the storage power supply terminal TVDD and the supply node NVOUT via the diode of the switch SWA. The storage power supply voltage VDD is supplied via the diode of the switch SWA or the battery power supply voltage VBAT is supplied via the diode of the switch SWBa to the supply node NVOUT as the voltage VOUT.

Hereinafter, switch control using the above switch states will be described. More detailed switch control will be described with reference to FIG. 15 and subsequent drawings.

In the embodiment, the circuit device 100 includes the battery power supply terminal TVBAT coupled to the battery 70, the energy harvest power supply terminal TVDD2 coupled to the energy harvest power supply 60, the storage power supply terminal TVDD coupled to the storage capacitor 50, the power supply switch circuit 110, and the control circuit 120 that controls the power supply switch circuit 110. In a first state, the power supply switch circuit 110 outputs the storage power supply voltage VDD from the storage power supply terminal TVDD to the supply node NVOUT while charging the battery 70 by supplying the energy harvest power supply voltage VDD2 from the energy harvest power supply terminal TVDD2 to the battery power supply terminal TVBAT. In a second state, the power supply switch circuit 110 outputs the storage power supply voltage VDD and the energy harvest power supply voltage VDD2 to the supply node NVOUT while charging the storage capacitor 50 by supplying the energy harvest power supply voltage VDD2 to the storage power supply terminal TVDD.

The first state corresponds to the battery charge state ST2 in the EH normal mode shown in FIG. 6. The second state corresponds to the storage capacitor recharge state ST3 in the EH normal mode shown in FIG. 7.

According to the embodiment, although the unstable energy harvest power supply 60 is used, the power supply switch circuit 110 appropriately switches between the energy harvest power supply 60, the storage capacitor 50 and the battery 70, such that a power supply can be stably supplied to the circuit device 100. That is, in both the first state and the second state, the power is supplied from the storage capacitor 50 to the supply node NVOUT. At this time, the storage capacitor 50 can function as a stable power supply by being charged by the energy harvest power supply 60 in the second state. In addition, the battery 70 can function as a backup power supply when the energy harvest power supply 60 stops power generation by being charged by the energy harvest power supply 60 in the first state.

In the embodiment, in the second state, the power supply switch circuit 110 disconnects the energy harvest power supply 60 from the battery 70 to stop charging the battery 70 and stores power from the energy harvest power supply 60 to the storage capacitor 50. In this way, since the charging of the battery 70 is stopped, the storage capacitor 50 can be rapidly charged.

In the embodiment, in the first state, the power supply switch circuit 110 disconnects the energy harvest power supply 60 from the supply node NVOUT, and charges the battery 70 from the energy harvest power supply 60. In this way, the power supply from the energy harvest power supply 60 to the supply node NVOUT is stopped, and thus the battery 70 is efficiently charged.

In the embodiment, in a startup period, the power supply switch circuit 110 charges the storage capacitor 50 by supplying the energy harvest power supply voltage VDD2 to the storage power supply terminal TVDD. The power supply switch circuit 110 repeats the first state and the second state after the startup period.

For example, as described later in FIG. 15, in a battery charging period after the startup period, the battery charge state ST2 in the EH normal mode corresponding to the first state and the storage capacitor recharge state ST3 corresponding to the second state are repeated.

According to the embodiment, the power is supplied from the energy harvest power supply 60 or the storage capacitor 50 to the supply node NVOUT after the startup period. Accordingly, since the battery 70 is not consumed while the energy harvest power supply 60 is generating power, the battery 70 is kept charged when the power generation of the energy harvest power supply 60 is stopped and the mode shifts to the backup mode. Accordingly, the battery 70 can drive the circuit device 100 for a long period after the mode shifts to the backup mode. For example, the real-time clock device 200 needs to keep outputting the current time point information, and can continue to operate for a long time even after the energy harvest power supply 60 stops the power generation.

In the embodiment, the power supply switch circuit 110 outputs the battery power supply voltage VBAT to the supply node NVOUT when the energy harvest power supply voltage VDD2 is not supplied.

The state corresponds to the backup mode shown in FIGS. 12 and 13. In the backup mode, the power supply switch circuit 110 outputs the battery power supply voltage VBAT to the supply node NVOUT.

According to the embodiment, the battery 70 is charged by repeating the first state and the second state while the energy harvest power supply 60 is generating power, and the battery 70 can be used as a backup power supply when the energy harvest power supply 60 stops generating power. As described above, since the switch control is performed such that the battery 70 is not consumed while the energy harvest power supply 60 is generating power, the circuit device 100 can be driven by the backup power supply for a long time.

In the embodiment, when the battery 70 and the storage capacitor 50 are fully charged, the power supply switch circuit 110 discharges the energy harvest power supply voltage VDD2 and does not supply the energy harvest power supply voltage VDD2 to the battery power supply terminal TVBAT or the storage power supply terminal TVDD.

The state corresponds to the fully charged state ST4 in the EH normal mode shown in FIG. 8. In the fully charged state ST4, the energy harvest power supply voltage VDD2 is discharged via the resistor RL. The energy harvest power supply terminal TVDD2 and the battery power supply terminal TVBAT are not coupled, and the energy harvest power supply terminal TVDD2 and the storage power supply terminal TVDD are not coupled.

According to the embodiment, although the energy harvest power supply 60 is generating power, the energy harvest power supply voltage VDD2 can be discharged when the power is unnecessary. The energy harvest power supply 60 may fail due to the absence of load, which is a failure that can be avoided according to the embodiment.

In the embodiment, the power supply switch circuit 110 outputs the storage power supply voltage VDD to the supply node NVOUT when the battery 70 and the storage capacitor 50 are fully charged.

The state corresponds to the fully charged state ST4 in the EH normal mode shown in FIG. 8. In the fully charged state ST4, the storage capacitor 50 is coupled to the supply node NVOUT via the switch SWA. The battery 70 and the supply node NVOUT are cut off by the switch SWB. According to the embodiment, since the switch control is performed such that the battery 70 is not consumed while the energy harvest power supply 60 is generating power, the circuit device 100 can be driven by the backup power supply for a long time after the energy harvest power supply 60 stops generating power.

In the embodiment, the circuit device 100 includes the power supply output terminal TVBOUT that outputs the voltage VOUT of the supply node NVOUT to the outside of the circuit device 100.

According to the embodiment, the power supply switch circuit 110 outputs the energy harvest power supply voltage VDD2, the storage power supply voltage VDD, or the battery power supply voltage VBAT as the voltage VOUT to the supply node NVOUT. By providing the power supply output terminal TVBOUT, the voltage VOUT can be supplied from the power supply output terminal TVBOUT to the external circuit 90.

In the embodiment, the circuit device 100 includes the interface circuit 140 and the memory 130. The control parameter 131 of the power supply switch circuit 110 can be written to the memory 130 via the interface circuit 140. The control circuit 120 is a processor that operates based on the control parameter 131 stored in the memory 130.

According to the embodiment, the operation of the power supply switch circuit 110 is programmable. That is, by rewriting the content of the control parameter 131, the power supply switch circuit 110 can perform various switch operations.

In the embodiment, the power supply switch circuit 110 includes the first switch SWA, the second switch SWB, the third switch SWC, and the fourth switch SWD. The first switch SWA is provided between the storage power supply terminal TVDD and the supply node NVOUT. The second switch SWB is provided between the battery power supply terminal TVBAT and the supply node NVOUT. The third switch SWC is provided between the battery power supply terminal TVBAT and the energy harvest power supply terminal TVDD2. The fourth switch SWD is provided between the energy harvest power supply terminal TVDD2 and the storage power supply terminal TVDD.

According to the embodiment, by controlling the first switch SWA, the second switch SWB, the third switch SWC, and the fourth switch SWD to be turned on or off, the energy harvest power supply 60, the storage capacitor 50, and the battery 70 can be appropriately switched to supply a stable power supply to the circuit device 100. In addition, only the fourth switch SWD is provided in a charging path from the energy harvest power supply 60 to the storage capacitor 50, and only the third switch SWC is provided in a charging path from the energy harvest power supply 60 to the battery 70. By reducing the number of switches provided in the charging paths in this manner, efficient charging can be implemented.

In the embodiment, in the first state, the first switch SWA and the third switch SWC are turned on, and the second switch SWB and the fourth switch SWD are turned off. In the second state, the first switch SWA and the fourth switch SWD are turned on, and the second switch SWB and the third switch SWC are turned off.

In the first state, the battery 70 is charged with the energy harvest power supply voltage VDD2 by turning on the third switch SWC. In the second state, the storage capacitor 50 is charged with the energy harvest power supply voltage VDD2 by turning on the fourth switch SWD. In the first state and the second state, the first switch SWA is turned on and the second switch SWB is turned off, such that the storage power supply voltage VDD is supplied to the supply node NVOUT and the battery 70 is cut off from the supply node NVOUT.

In the embodiment, the circuit device 100 includes the power supply output terminal TVBOUT. The power supply switch circuit 110 includes the fifth switch SWE provided between the supply node NVOUT and the power supply output terminal TVBOUT.

According to the embodiment, the supply node NVOUT and the power supply output terminal TVBOUT are coupled by turning on the fifth switch SWE. Accordingly, the voltage VOUT output from the power supply switch circuit 110 to the supply node NVOUT can be supplied from the power supply output terminal TVBOUT to the external circuit 90. For example, in the VBOUT output on state ST6 in the EH normal mode shown in FIG. 9, the VBOUT output on state ST52 in the normal mode shown in FIG. 11, and the VBOUT output on state ST54 in the backup mode shown in FIG. 13, the fifth switch SWE is turned on.

In the embodiment, in a third state, the second switch SWB and the fifth switch SWE are turned on, the third switch SWC and the fourth switch SWD are turned off, and the power supply switch circuit 110 outputs the battery power supply voltage VBAT to the supply node NVOUT and the power supply output terminal TVBOUT. The third state corresponds to the VBOUT output on state. The third state is, for example, the VBOUT output on state ST6 in the EH normal mode in FIG. 9, and may be the state in FIG. 11 or FIG. 13.

According to the embodiment, the power supply can be supplied from the battery 70 having stable discharge capability to the external circuit 90 coupled to the power supply output terminal TVBOUT. In addition, the battery 70 is sufficiently charged in the first state, and then the state is changed to the third state, such that the stable power supply can be supplied to the external circuit 90. For example, when a wireless device such as Bluetooth Low Energy (BLE) is directly driven as the external circuit 90 coupled to the power supply output terminal TVBOUT, a power supply having stable discharge capability is required. Therefore, in FIG. 9, after charging the battery 70 with power sufficient to drive the battery 70 and determining that the battery 70 is drivable by a voltage monitor, it is possible to start the output from the battery 70 to the power supply output terminal TVBOUT under the control of the fifth switch SWE at a preset output timing. Further, in this case, the third switch SWC and the fourth switch SWD are cut off so as not to depend on a power generation state of the energy harvest power supply 60, and stable battery output and efficient battery recharging can be repeatedly controlled. As shown in FIGS. 9, 11, and 13, when the power is output from the battery 70 to the power supply output terminal TVBOUT, a power supply directly affected by the unstable energy harvest power supply voltage VDD2 is not output to the power supply output terminal TVBOUT regardless of presence or absence of the input of the energy harvest power supply 60, and the stable power supply can be output.

In the embodiment, the control circuit 120 performs a real-time clock process based on the oscillation signal of the oscillation circuit 170. A power supply voltage of the control circuit 120 is supplied based on the voltage VOUT of the supply node NVOUT.

According to the embodiment, although the unstable energy harvest power supply 60 is used, the stable power supply can be supplied to the supply node NVOUT by appropriately switching the power supply by the power supply switch circuit 110. Accordingly, the control circuit 120 can generate the current time point information by performing the real-time clock process under the stable power supply.

Note that "the power supply voltage of the control circuit is supplied based on the voltage of the supply node" means, for example, that the voltage of the supply node is supplied to the control circuit as the power supply voltage, or that the voltage of the supply node is regulated and the regulated voltage is supplied to the control circuit as the power supply voltage. In the configuration example of FIG. 1, the regulator 160 regulates the voltage VOUT to generate the power supply voltage VLOG of the control circuit 120, and the present disclosure is not limited thereto.

3. Details of Switch Control

Figure 15:
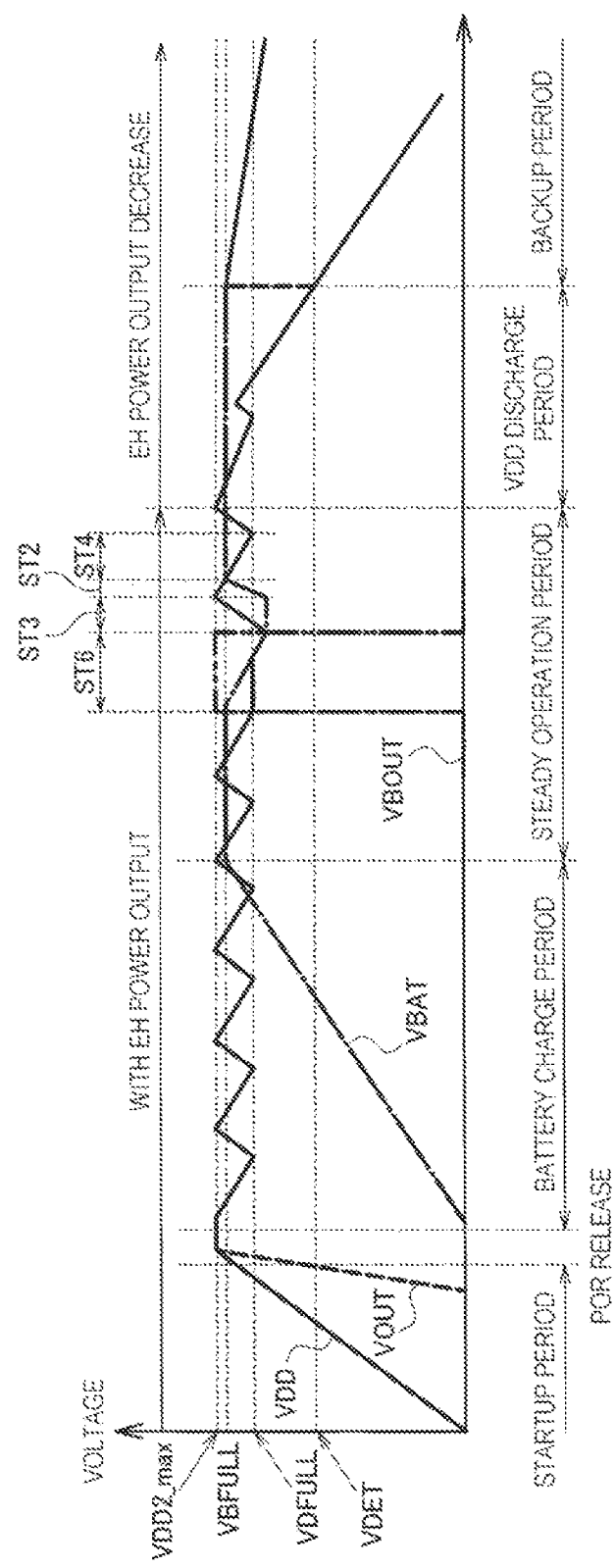
FIG. 15 shows an example of a voltage waveform.

FIG. 15 shows an example of a voltage waveform. Here, a voltage waveform is shown in a case in which the energy harvest power supply 60 starts up in a state of generating power to reach a steady operation and then the energy harvest power supply 60 stops generating power. However, the voltage waveform in FIG. 15 is an example, and various voltage transitions may be taken according to the state of the energy harvest power supply 60 and the like according to state transitions to be described later.

As shown in a "startup period", when the energy harvest power supply 60 outputs power, the switch control circuit 111 sets the power supply switch circuit 110 to the storage capacitor charge state ST1 in the startup mode. Here, it is assumed that the energy harvest power supply voltage VDD2 is a maximum power point voltage VDD2 max. The energy harvest power supply 60 charges the storage capacitor 50 via the switch SWD and increases the voltage VOUT via the switch SWA.

As shown in "POR release", when the voltage VOUT exceeds a threshold value of the power-on reset circuit PORD, the power-on reset circuit PORD releases a reset of the control circuit 120. Thereafter, the control circuit 120 controls the power supply switch circuit 110. When the storage capacitor 50 is fully charged, the control circuit 120 sets the power supply switch circuit 110 to the battery charge state ST2 in the EH normal mode.

As shown in the "battery charging period", the battery 70 is charged until the battery power supply voltage VBAT exceeds a full-charge threshold value VBFULL. Specifically, the control circuit 120 alternately and repeatedly sets the power supply switch circuit 110 between the battery charge state ST2 and the storage capacitor recharge state ST3 in the EH normal mode. In the battery charge state ST2, since the storage capacitor 50 supplies the voltage VOUT, the storage power supply voltage VDD decreases and the voltage VOUT decreases. When the battery 70 is charged by the energy harvest power supply 60, the battery power supply voltage VBAT increases. In the storage capacitor recharge state ST3, since the storage capacitor 50 is charged by the energy harvest power supply 60, the storage power supply voltage VDD increases, and the voltage VOUT increases.

As shown in a "steady operation period", when the battery power supply voltage VBAT exceeds the full-charge threshold value VBFULL, a steady operation is performed.

Specifically, the control circuit 120 alternately and repeatedly sets the power supply switch circuit 110 between the fully charged state ST4 and the storage capacitor recharge state ST3 in the EH normal mode. In the fully charged state ST4, since the storage capacitor 50 supplies the voltage VOUT, the storage power supply voltage VDD decreases and the voltage VOUT decreases. In the storage capacitor recharge state ST3, since the storage capacitor 50 is charged by the energy harvest power supply 60, the storage power supply voltage VDD increases, and the voltage VOUT increases.

In the "steady operation period", the power supply switch circuit 110 may be set to the VBOUT output on state ST6 in the EH normal mode at any timing. As will be described later with reference to FIGS. 20 to 23, turning on and off of the VBOUT output is freely controlled based on an interrupt function of a timer or an alarm in a preset RTC and internal and external event signals after the steady operation period. In the state ST6, since the battery power supply voltage VBAT is output to the supply node NVOUT and the power supply output terminal TVBOUT, VBOUT=VBAT is satisfied. Since the battery power supply voltage VBAT decreases as the battery 70 supplies power to the external circuit 90, the voltage VOUT of the supply node NVOUT decreases. In addition, since the storage power supply voltage VDD is supplied to the supply node NVOUT via the diode of the switch SWA, when the battery power supply voltage VBAT decreases, the storage power supply voltage VDD decreases together with the battery power supply voltage VBAT from a certain time point.

When the VBOUT output on state ST6 in the EH normal mode is released, the control circuit 120 sets the power supply switch circuit 110 to the storage capacitor recharge state ST3 in the EH normal mode. In the state ST3, the storage capacitor 50 is charged, and the storage power supply voltage VDD increases. When the storage capacitor 50 is fully charged, the control circuit 120 sets the power supply switch circuit 110 to the battery charge state ST2 in the EH normal mode. In the state ST2, the battery 70 is charged, and the battery power supply voltage VBAT increases. Since the power is supplied from the storage capacitor 50 to the supply node NVOUT, the storage power supply voltage VDD decreases. When the battery 70 is fully charged, the control circuit 120 sets the power supply switch circuit 110 to the fully charged state ST4 in the EH normal mode. Since the power is supplied from the storage capacitor 50 to the supply node NVOUT, the storage power supply voltage VDD decreases. Thereafter, the control circuit 120 alternately and repeatedly sets the power supply switch circuit 110 between the fully charged state ST4 and the storage capacitor recharge state ST3 in the EH normal mode.

As shown in a "VDD discharge period", when the output of the energy harvest power supply 60 decreases, the power supply switch circuit 110 is set to the fully charged state ST4 or the storage capacitor recharge state ST3 in the EH normal mode until a transition condition to the normal mode is satisfied. In the fully charged state ST4, the storage power supply voltage VDD and the voltage VOUT decrease. In the storage capacitor recharge state ST3, the storage power supply voltage VDD and the voltage VOUT increase. However, since the output of the energy harvest power supply 60 decreases, the storage power supply voltage VDD is not fully charged, and the storage power supply voltage VDD and the voltage VOUT decrease with the decrease in the output of the energy harvest power supply 60. When the output of the energy harvest power supply 60 decreases and the transition condition to the normal mode is satisfied, the control circuit 120 sets the power supply switch circuit 110 to the normal mode. In the normal mode, the power is supplied to the circuit device 100 by discharging the storage capacitor 50. FIG. 15 shows a waveform when the power supply switch circuit 110 is set to the VBOUT output off state ST51 in the normal mode. Since the storage capacitor 50 supplies the voltage VOUT, the storage power supply voltage VDD decreases and the voltage VOUT decreases.

As shown in a "backup period", when the storage power supply voltage VDD output as the voltage VOUT to the supply node NVOUT is equal to or lower than a voltage VDET, the power supply of the circuit device 100 is immediately switched to the backup power supply. Specifically, the control circuit 120 sets the power supply switch circuit 110 to the backup mode. Since the battery 70 supplies the voltage VOUT, the battery power supply voltage VBAT gradually decreases, and the voltage VOUT gradually decreases. A comparator (not shown) included in the power supply switch circuit 110 detects that the storage power supply voltage VDD is equal to or lower than the voltage VDET. The comparator compares the storage power supply voltage VDD with the voltage VDET, and outputs a signal of a comparison result to the control circuit 120.

According to the embodiment, although the unstable energy harvest power supply 60 is used, the power supply switch circuit 110 appropriately switches between the energy harvest power supply 60, the storage capacitor 50 and the battery 70, such that the power supply can be stably supplied to the circuit device 100.

In the EH normal mode in which the energy harvest power supply 60 is generating power, the battery 70 is not consumed except for the VBOUT output on state, and the power is supplied from the energy harvest power supply 60 or the storage capacitor 50 to the circuit device 100. Accordingly, when the power generation of the energy harvest power supply 60 is stopped and the mode shifts to the backup mode, the battery 70 is kept charged, and thus the battery 70 can drive the circuit device 100 for a long period after the mode shifts to the backup mode.

Figure 16:
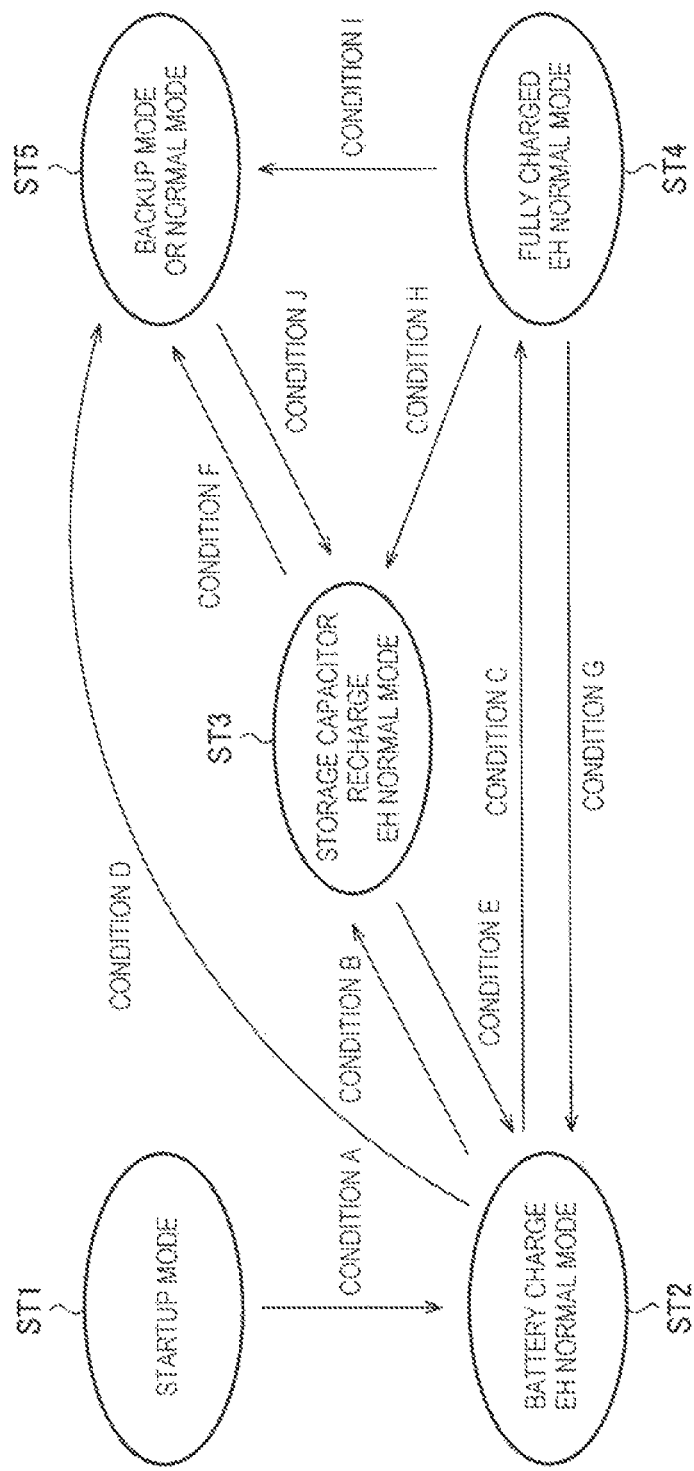
FIG. 16 shows an example of state transitions.

FIG. 16 shows an example of the state transitions. FIGS. 17 and 18 show examples of the transition conditions. Here, although certain states are omitted or simplified, those states will be described later with reference to FIGS. 19 to 23.

The control circuit 120 determines whether a condition A is satisfied in the storage capacitor charge state ST1 in the startup mode. When the condition A is satisfied, the control circuit 120 causes the power supply switch circuit 110 to transition to the battery charge state ST2 in the EH normal mode. The condition A is that (a1) the energy harvest power supply voltage VDD2 is higher than a threshold value pVDD2_OFF, (a2) the storage power supply voltage VDD is higher than a threshold value pVDFULL, and (a3) the storage power supply voltage VDD is higher than a threshold value VDD_POR. The condition (a1) indicates that the energy harvest power supply 60 is turned on. The condition (a2) indicates that the storage capacitor 50 is fully charged. The condition (a3) indicates that the power-on reset signal R_VDD reaches the reset release level.

The control circuit 120 determines whether a condition B is satisfied in the battery charge state ST2 in the EH normal mode. When the condition B is satisfied, the control circuit 120 causes the power supply switch circuit 110 to transition to the storage capacitor recharge state ST3 in the EH normal mode. The condition B is that (b1) the energy harvest power supply voltage VDD2 is higher than the threshold value pVDD2_OFF, and (b2) the storage power supply voltage VDD is lower than a threshold value mVDFULL. The condition (b2) indicates that recharging of the storage capacitor 50 is necessary. The threshold value mVDFULL is lower than the threshold value pVDFULL.

The control circuit 120 determines whether a condition C is satisfied in the battery charge state ST2 in the EH normal mode. When the condition C is satisfied, the control circuit 120 causes the power supply switch circuit 110 to transition to the fully charged state ST4 in the EH normal mode. The condition C is that (c1) the energy harvest power supply voltage VDD2 is higher than the threshold value pVDD2_OFF, (c2) the storage power supply voltage VDD is higher than the threshold value mVDFULL, and (c3) the battery power supply voltage VBAT is higher than a threshold value pVBFULL. The condition (c2) indicates that the recharging of the storage capacitor 50 is unnecessary. The condition (c3) indicates that the battery 70 is fully charged.

The control circuit 120 determines whether a condition D is satisfied in the battery charge state ST2 in the EH normal mode. When the condition D is satisfied, the control circuit 120 causes the power supply switch circuit 110 to transition to a state ST5. The state ST5 is a state included in the backup mode or the normal mode. The condition D is that (d1) the energy harvest power supply voltage VDD2 is lower than a threshold value mVDD2_OFF. The condition (d1) indicates that the energy harvest power supply 60 is turned off. The threshold value mVDD2_OFF is lower than the threshold value pVDD2_OFF.

The control circuit 120 determines whether a condition E is satisfied in the storage capacitor recharge state ST3 in the EH normal mode. When the condition E is satisfied, the control circuit 120 causes the power supply switch circuit 110 to transition to the battery charge state ST2 in the EH normal mode. The condition E is that (e1) the energy harvest power supply voltage VDD2 is higher than the threshold value pVDD2_OFF, and (e2) the storage power supply voltage VDD is higher than the threshold value pVDFULL.

The control circuit 120 determines whether a condition F is satisfied in the storage capacitor recharge state ST3 in the EH normal mode. When the condition F is satisfied, the control circuit 120 causes the power supply switch circuit 110 to transition to the state ST5. The condition F is that (f1) the energy harvest power supply voltage VDD2 is lower than the threshold value mVDD2_OFF.

The control circuit 120 determines whether a condition G is satisfied in the fully charged state ST4 in the EH normal mode. When the condition G is satisfied, the control circuit 120 causes the power supply switch circuit 110 to transition to the battery charge state ST2 in the EH normal mode. The condition G is that (g1) the energy harvest power supply voltage VDD2 is higher than the threshold value pVDD2_OFF, (g2) the storage power supply voltage VDD is higher than the threshold value mVDFULL, and (g3) the battery power supply voltage VBAT is lower than a threshold value mVBFULL. The condition (g3) indicates that the recharging of the battery 70 is necessary. The threshold value mVBFULL is lower than the threshold value pVBFULL.

The control circuit 120 determines whether a condition H is satisfied in the fully charged state ST4 in the EH normal mode. When the condition H is satisfied, the control circuit 120 causes the power supply switch circuit 110 to transition to the storage capacitor recharge state ST3 in the EH normal mode. The condition H is that (h1) the energy harvest power supply voltage VDD2 is higher than the threshold value pVDD2_OFF, and (h2) the storage power supply voltage VDD is lower than the threshold value mVDFULL.

The control circuit 120 determines whether a condition I is satisfied in the fully charged state ST4 in the EH normal mode. When the condition I is satisfied, the control circuit 120 causes the power supply switch circuit 110 to transition to the state ST5. The condition I is that (i1) the energy harvest power supply voltage VDD2 is lower than the threshold value mVDD2_OFF.

The control circuit 120 determines whether a condition J is satisfied in the state ST5. When the condition J is satisfied, the control circuit 120 causes the power supply switch circuit 110 to transition to the storage capacitor recharge state ST3 in the EH normal mode. The condition J is that (j1) the energy harvest power supply voltage VDD2 is higher than the threshold value pVDD2_OFF.

Figure 19:
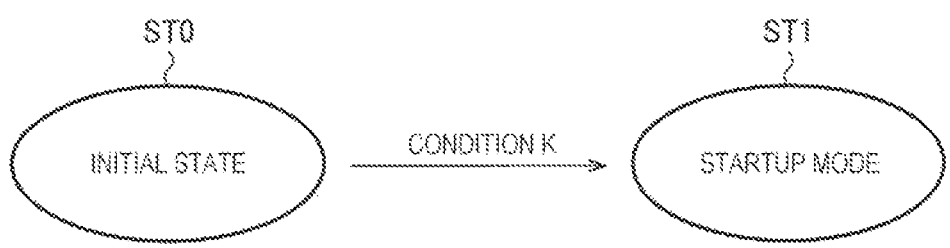
FIG. 19 shows an example of a state transition related to the initial state.
Figure 20:
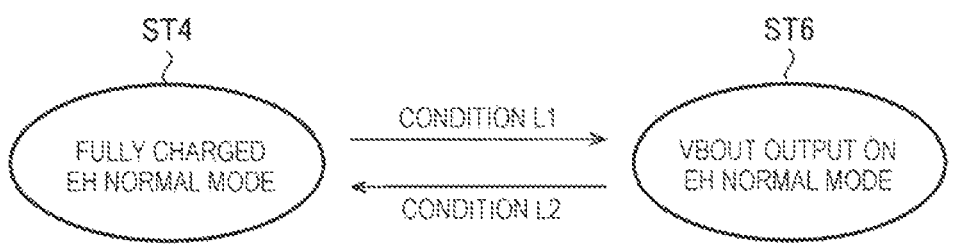
FIG. 20 shows an example of a state transition related to the VBOUT output on state in the EH normal mode.

FIG. 19 shows an example of the state transition related to the initial state. FIG. 20 shows an example of the state transition related to the VBOUT output on state in the EH normal mode. FIG. 21 shows an example of the transition conditions of the state transitions.

When a condition K is satisfied in the initial state ST0, the switch control circuit 111 causes the power supply switch circuit 110 to transition to the storage capacitor charge state ST1 in the startup mode. The condition K is that (k1) the energy harvest power supply voltage VDD2 is higher than the threshold value pVDD2_OFF, and (k2) the storage power supply voltage VDD and the battery power supply voltage VBAT are voltages in the initial state. The condition (k2) is, for example, a condition that the storage power supply voltage VDD and the battery power supply voltage VBAT are equal to a ground voltage GND.

The control circuit 120 determines whether a condition L1 is satisfied in the fully charged state ST4 in the EH normal mode. When the condition L1 is satisfied, the control circuit 120 causes the power supply switch circuit 110 to transition to the VBOUT output on state ST6 in the EH normal mode. The condition L1 is that an internal trigger or an external trigger occurs. The internal trigger is a trigger that occurs in the circuit device 100. An example of the internal trigger is that a timer counts an elapse of a predetermined time, or that a specific time point is reached in a real-time clock process. The external trigger is a trigger that is input to the circuit device 100 from the outside of the circuit device 100. An example of the external trigger is a trigger transmitted by an external processing device to the control circuit 120 via the interface circuit 140.

The control circuit 120 determines whether a condition L2 is satisfied in the VBOUT output on state ST6 in the EH normal mode. When the condition L2 is satisfied, the control circuit 120 causes the power supply switch circuit 110 to transition to the fully charged state ST4 in the EH normal mode. The condition L2 is that the internal trigger or the external trigger occurs.

Figure 22:
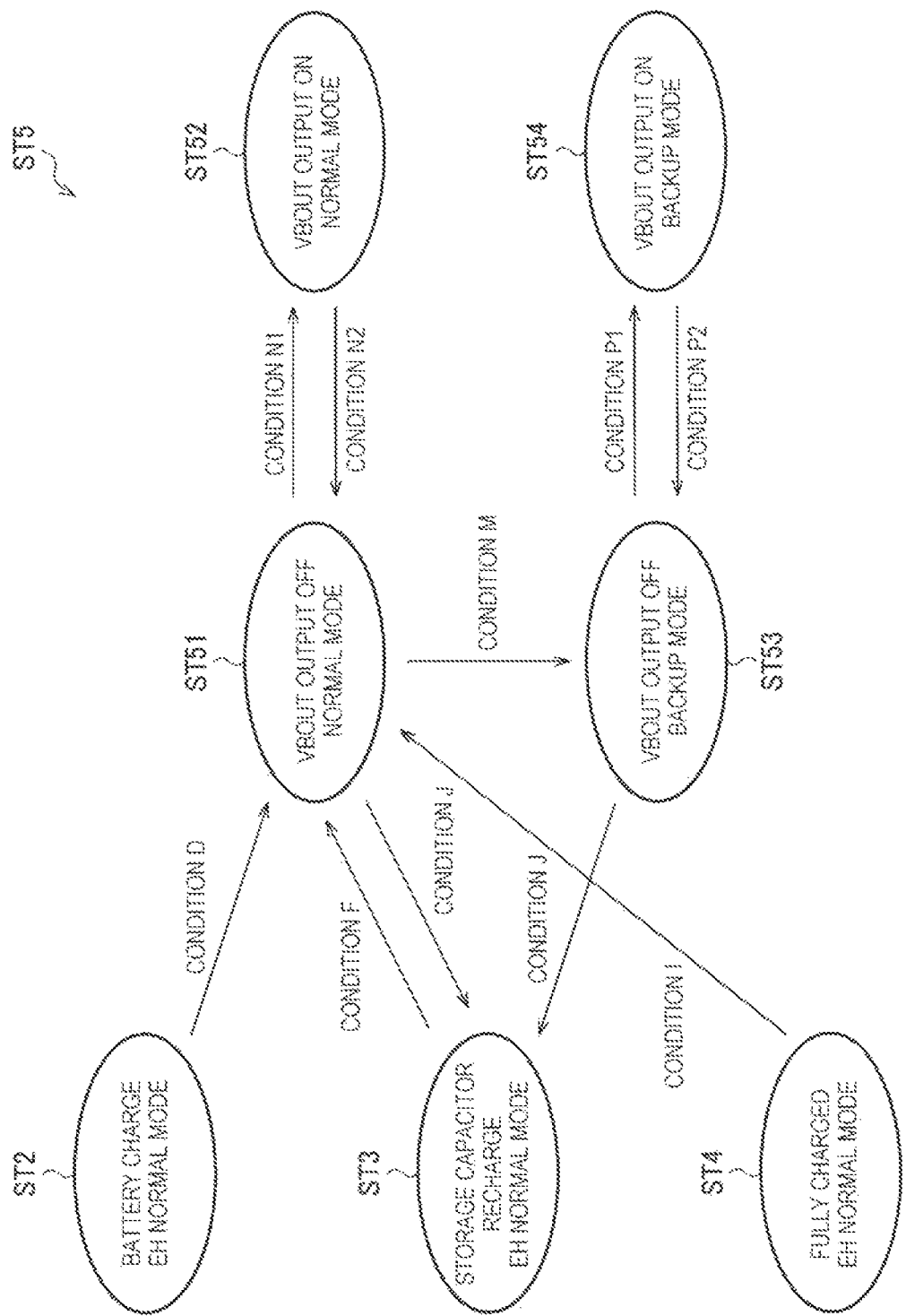
FIG. 22 shows an example of state transitions related to the normal mode and the backup mode.

FIG. 22 shows an example of the state transition related to the normal mode and the backup mode. FIG. 23 shows an example of the transition conditions of the state transitions.

When the condition D is satisfied in the battery charge state ST2 in the EH normal mode or when the condition F is satisfied in the storage capacitor recharge state ST3 in the EH normal mode, the control circuit 120 causes the power supply switch circuit 110 to transition to the VBOUT output off state ST51 in the normal mode. When the condition I is satisfied in the fully charged state ST4 in the EH normal mode, the control circuit 120 causes the power supply switch circuit 110 to transition to the VBOUT output off state ST51 in the normal mode. When the condition J is satisfied in the VBOUT output off state ST51 in the normal mode or the VBOUT output off state ST53 in the backup mode, the control circuit 120 causes the power supply switch circuit 110 to transition to the storage capacitor recharge state ST3 in the EH normal mode. The conditions D, F, I, and J are as described above.

The control circuit 120 determines whether a condition M is satisfied in the VBOUT output off state ST51 in the normal mode. When the condition M is satisfied, the control circuit 120 causes the power supply switch circuit 110 to transition to the VBOUT output off state ST53 in the backup mode. The condition M is a condition that (m1) the energy harvest power supply voltage VDD2 is lower than the threshold value mVDD2_OFF, and (m2) the storage power supply voltage VDD is lower than the threshold value mVDFULL.

The control circuit 120 determines whether a condition N1 is satisfied in the VBOUT output off state ST51 in the normal mode. When the condition N1 is satisfied, the control circuit 120 causes the power supply switch circuit 110 to transition to the VBOUT output on state ST52 in the normal mode. The condition N1 is that the internal trigger or the external trigger occurs.

The control circuit 120 determines whether a condition N2 is satisfied in the VBOUT output on state ST52 in the normal mode. When the condition N2 is satisfied, the control circuit 120 causes the power supply switch circuit 110 to transition to the VBOUT output off state ST51 in the normal mode. The condition N2 is that the internal trigger or the external trigger occurs.

The control circuit 120 determines whether a condition P1 is satisfied in the VBOUT output off state ST53 in the backup mode. When the condition P1 is satisfied, the control circuit 120 causes the power supply switch circuit 110 to transition to the VBOUT output on state ST54 in the backup mode. The condition P1 is that the internal trigger or the external trigger occurs.

The control circuit 120 determines whether a condition P2 is satisfied in the VBOUT output on state ST54 in the backup mode. When the condition P2 is satisfied, the control circuit 120 causes the power supply switch circuit 110 to transition to the VBOUT output off state ST53 in the backup mode. The condition P2 is that the internal trigger or the external trigger occurs.

Figure 24:
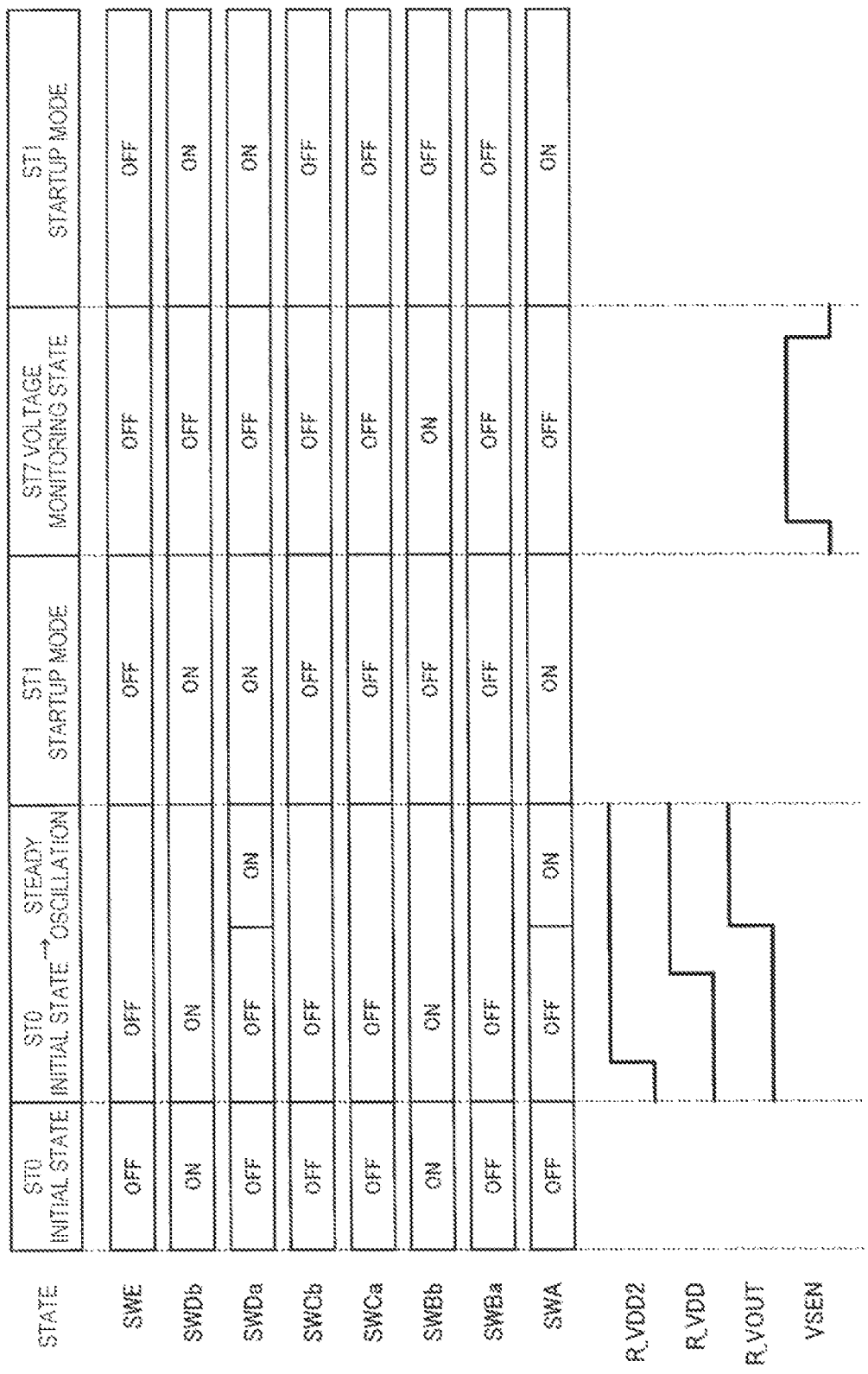
FIG. 24 shows an example of a timing chart showing progress of the state transitions.

FIGS. 24, 25, and 26 show examples of timing charts showing progress of the state transitions. In FIG. 24, time elapses from left to right, and subsequently, in FIG. 25, time elapses from left to right. The timing charts in FIGS. 24, 25, and 26 are merely examples, and various state transitions may be performed according to the state of the energy harvest power supply 60 or the like according to the state transitions described above.

As shown in FIG. 24, when the energy harvest power supply 60 starts supplying power in the initial state ST0, the power-on reset signal R_VDD2 changes from the reset level to the reset release level. Here, it is assumed that a low level is the reset level and a high level is the reset release level. When the energy harvest power supply 60 charges the storage capacitor 50 via the diode of the switch SWDa, the power-on reset signal R_VDD changes from the reset level to the reset release level. When the energy harvest power supply 60 increases the voltage VOUT via the diode of the switch SWDa and the diode of the switch SWA, the power-on reset signal R_VOUT changes from the reset level to the reset release level. Up to this point, the switch control circuit 111 sets the power supply switch circuit 110 to the initial state ST0.

When the power-on reset signal R_VOUT reaches the reset release level, the reset of the control circuit 120 is released. Thereafter, the control circuit 120 controls the power supply switch circuit 110. The control circuit 120 causes the power supply switch circuit 110 to transition to the storage capacitor charge state ST1 in the startup mode.

Here, it is assumed that the initial state ST0 transitions to the startup mode when the power-on reset signal R_VOUT reaches the reset release level. As described with reference to FIGS. 19 and 21, the initial state ST0 may transition to the startup mode when the power-on reset signal R_VDD2 reaches the reset release level.

The control circuit 120 intermittently sets the power supply switch circuit 110 to the voltage monitoring state ST7 in the storage capacitor charge state ST1 in the startup mode, and causes the voltage detection circuit 150 to perform the voltage detection in the voltage monitoring state ST7. Although the voltage monitoring state ST7 is shown only once in FIG. 24, for example, the voltage monitoring state ST7 is set repeatedly at regular intervals. The control circuit 120 intermittently sets the power supply switch circuit 110 to the voltage monitoring state ST7 not only in the startup mode but also in each mode and each state. VSEN is an enable signal of the voltage detection circuit 150. Here, a high level indicates that the voltage detection circuit 150 is enabled.

As shown in FIG. 25, in the storage capacitor charge state ST1 in the startup mode, the power supply switch circuit 110 intermittently enters the voltage monitoring state ST7, and transitions to the battery charge state ST2 in the EH normal mode when the condition in the voltage monitoring state ST7 is satisfied. FIG. 25 shows only the voltage monitoring states ST7 when the transition condition is satisfied among the intermittent voltage monitoring states ST7. Hereinafter, the intermittent voltage monitoring states ST7 are omitted in the same manner. In the battery charge state ST2 in the EH normal mode, the power supply switch circuit 110 intermittently enters the voltage monitoring state ST7, and transitions to the storage capacitor recharge state ST3 in the EH normal mode when the condition in the voltage monitoring state ST7 is satisfied. In the storage capacitor recharge state ST3 in the EH normal mode, the power supply switch circuit 110 intermittently enters the voltage monitoring state ST7, and transitions to the battery charge state ST2 in the EH normal mode when the condition in the voltage monitoring state ST7 is satisfied. In the battery charge state ST2 in the EH normal mode, the power supply switch circuit 110 intermittently enters the voltage monitoring state ST7, and transitions to the fully charged state ST4 in the EH normal mode when the condition in the voltage monitoring state ST7 is satisfied. In FIG. 25, after the initial battery charge state ST2, the storage capacitor recharge state ST3 and the battery charge state ST2 are performed only once. The storage capacitor recharge state ST3 and the battery charge state ST2 may be performed a plurality of times.

As shown in FIG. 26, in the fully charged state ST4 in the EH normal mode, the power supply switch circuit 110 intermittently enters the voltage monitoring state ST7, and transitions to the VBOUT output on state ST6 in the EH normal mode when the condition is satisfied. In the VBOUT output on state ST6 in the EH normal mode, the power supply switch circuit 110 intermittently enters the voltage monitoring state ST7, and transitions to the fully charged state ST4 in the EH normal mode when the condition is satisfied. In the fully charged state ST4 in the EH normal mode, the power supply switch circuit 110 intermittently enters the voltage monitoring state ST7, and transitions to the state ST5 in the backup mode or the normal mode when the condition in the voltage monitoring state ST7 is satisfied.

Turning on and off states of the switches in each mode and state are as described with reference to FIGS. 4 to 14. In addition, the transition conditions between states are as described with reference to FIGS. 16 to 23.

Although the embodiment has been described in detail above, it will be easily understood by those skilled in the art that many modifications can be made without substantially departing from the novel matters and effects according to the present disclosure. Accordingly, such modifications are intended to be in the scope of the present disclosure. For example, a term described at least once together with a different term having a broader meaning or the same meaning in the description or the drawings can be replaced with the different term in any place in the description or the drawings. In addition, all combinations of the embodiment and the modifications are also within the scope of the disclosure. Configurations and operations of the energy harvest power supply, the storage capacitor, the battery, the circuit device, the resonator, the real-time clock device, the external circuit, the electronic device, and the like are not limited to those described in the embodiment, and various modifications are possible.

What is claimed is:

1. A circuit device comprising:
    a battery power supply terminal configured to be coupled to a battery;
    an energy harvest power supply terminal configured to be coupled to an energy harvest power supply;
    a storage power supply terminal configured to be coupled to a storage capacitor;
    a power supply switch circuit; and
    a control circuit configured to control the power supply switch circuit, wherein
    the power supply switch circuit
        outputs, in a first state, a storage power supply voltage from the storage power supply terminal to a supply node while charging the battery by supplying an energy harvest power supply voltage from the energy harvest power supply terminal to the battery power supply terminal, and
        outputs, in a second state, the storage power supply voltage and the energy harvest power supply voltage to the supply node while charging the storage capacitor by supplying the energy harvest power supply voltage to the storage power supply terminal.

2. The circuit device according to claim 1, wherein the power supply switch circuit
    charges, in a startup period, the storage capacitor by supplying the energy harvest power supply voltage to the storage power supply terminal, and
    repeats the first state and the second state after the startup period.

3. The circuit device according to claim 1, wherein the power supply switch circuit outputs a battery power supply voltage from the battery power supply terminal to the supply node when the energy harvest power supply voltage is not supplied.

4. The circuit device according to claim 1, wherein when the battery and the storage capacitor are fully charged, the power supply switch circuit discharges the energy harvest power supply voltage and does not supply the energy harvest power supply voltage to the battery power supply terminal or the storage power supply terminal.

5. The circuit device according to claim 4, wherein when the battery and the storage capacitor are fully charged, the power supply switch circuit outputs the storage power supply voltage to the supply node.

6. The circuit device according to claim 1, further comprising:
    a power supply output terminal configured to output a voltage of the supply node to outside of the circuit device.

7. The circuit device according to claim 1, further comprising:
    an interface circuit; and
    a memory configured to allow a control parameter of the power supply switch circuit to be written via the interface circuit, wherein
    the control circuit is a sequencer or a controller that operates based on the control parameter stored in the memory.

8. The circuit device according to claim 1, wherein the power supply switch circuit includes
    a first switch provided between the storage power supply terminal and the supply node,
    a second switch provided between the battery power supply terminal and the supply node,
    a third switch provided between the battery power supply terminal and the energy harvest power supply terminal, and
    a fourth switch provided between the energy harvest power supply terminal and the storage power supply terminal.

9. The circuit device according to claim 8, wherein
    in the first state, the first switch and the third switch are turned on and the second switch and the fourth switch are turned off, and
    in the second state, the first switch and the fourth switch are turned on and the second switch and the third switch are turned off.

10. The circuit device according to claim 8, further comprising:
    a power supply output terminal, wherein
    the power supply switch circuit includes a fifth switch provided between the supply node and the power supply output terminal.

11. The circuit device according to claim 10, wherein
    in a third state, the second switch and the fifth switch are turned on, the third switch and the fourth switch are turned off, and the power supply switch circuit outputs the battery power supply voltage to the supply node and the power supply output terminal.

12. The circuit device according to claim 1, wherein
    the control circuit performs a real-time clock process based on an oscillation signal of an oscillation circuit, and
    a power supply voltage of the control circuit is supplied based on a voltage of the supply node.

13. A real-time clock device comprising:
    the circuit device according to claim 12; and
    a resonator electrically coupled to the oscillation circuit.

* * * * *